(12) United States Patent
Herfurth

(10) Patent No.: US 9,602,018 B2
(45) Date of Patent: Mar. 21, 2017

(54) POWER CONVERTER WITH REDUCED POWER CONSUMPTION IN STANDBY MODE

(75) Inventor: Michael Herfurth, Gilching (DE)

(73) Assignee: INFINEON TECHNOLOGIES AUSTRIA AG, Villach (AT)

(*) Notice: Subject to any disclaimer, the term of this patent is extended or adjusted under 35 U.S.C. 154(b) by 776 days.

(21) Appl. No.: 13/424,609

(22) Filed: Mar. 20, 2012

(65) Prior Publication Data
US 2013/0250627 A1 Sep. 26, 2013

(51) Int. Cl.
*H02M 3/335* (2006.01)
*H02M 3/337* (2006.01)
*H02M 1/00* (2006.01)

(52) U.S. Cl.
CPC ......... *H02M 3/3376* (2013.01); *H02M 3/335* (2013.01); *H02M 3/33507* (2013.01); *H02M 2001/0032* (2013.01); *Y02B 70/1433* (2013.01); *Y02B 70/16* (2013.01)

(58) Field of Classification Search
CPC ............................ H02M 3/3376; H02M 3/335
USPC .. 363/21.15, 21.09, 21.12, 21.18, 21.17, 79, 363/21.07, 21.08, 21.1, 21.14, 21.16
See application file for complete search history.

(56) References Cited

U.S. PATENT DOCUMENTS

| | | | |
|---|---|---|---|
| 6,496,390 B2 | 12/2002 | Yang | |
| 2002/0036910 A1* | 3/2002 | Yang | ......................... 363/21.07 |
| 2008/0310194 A1* | 12/2008 | Huang et al. | .............. 363/21.18 |
| 2009/0189582 A1* | 7/2009 | Watanabe | ..................... 323/282 |
| 2010/0194463 A1* | 8/2010 | Moon | ..................... H02M 1/32 327/427 |

(Continued)

FOREIGN PATENT DOCUMENTS

| | | |
|---|---|---|
| CN | 1346211 A | 4/2002 |
| CN | 102332827 A | 1/2012 |

(Continued)

OTHER PUBLICATIONS

Michael Herfurth, "Application Note AN-TDA16850-1-010402 TDA16850—synchronizable flyback controller IC supporting different operating modes—Features", Infineon Technologies AG, Apr. 2001, pp. 1-13.

(Continued)

*Primary Examiner* — Matthew Nguyen
*Assistant Examiner* — Trinh Dang
(74) *Attorney, Agent, or Firm* — Viering, Jentschura & Partner mbB

(57) ABSTRACT

In accordance with various embodiments a converter is provided, including: a transformer comprising a primary side and a secondary side; a primary side circuit arrangement coupled to the primary side of the transformer; a secondary side circuit arrangement coupled to the secondary side of the transformer, wherein the secondary side circuit arrangement is configured to provide at least one of an output voltage and an output current; a coupling component configured to provide information about at least one of the output voltage and the output current to the primary side circuit arrangement; a first energy supply configured to provide the coupling component with a first current; and second energy supply configured to provide the coupling component with a second current, wherein the second current is lower than the first current.

20 Claims, 7 Drawing Sheets

(56) References Cited

U.S. PATENT DOCUMENTS

| | | | |
|---|---|---|---|
| 2010/0202170 A1* | 8/2010 | Kim | ............... H02M 3/33507 363/74 |
| 2011/0267846 A1* | 11/2011 | Djenguerian et al. | ..... 363/21.12 |
| 2012/0287684 A1 | 11/2012 | Fahlenkamp | |
| 2012/0327687 A1 | 12/2012 | Chueh et al. | |

FOREIGN PATENT DOCUMENTS

| | | |
|---|---|---|
| DE | 10146549 A1 | 4/2003 |
| DE | 10146549 B9 | 11/2004 |
| EP | 1919067 A1 | 5/2008 |
| WO | 2011051824 A1 | 5/2011 |

OTHER PUBLICATIONS

English abstract of DE 10146549 A1 of Apr. 24, 2003.
English abstract of EP 1919067 A1 of May 7, 2008.
Office Action issued in the corresponding German application No. 102013102855.1 dated May 15, 2014.

* cited by examiner

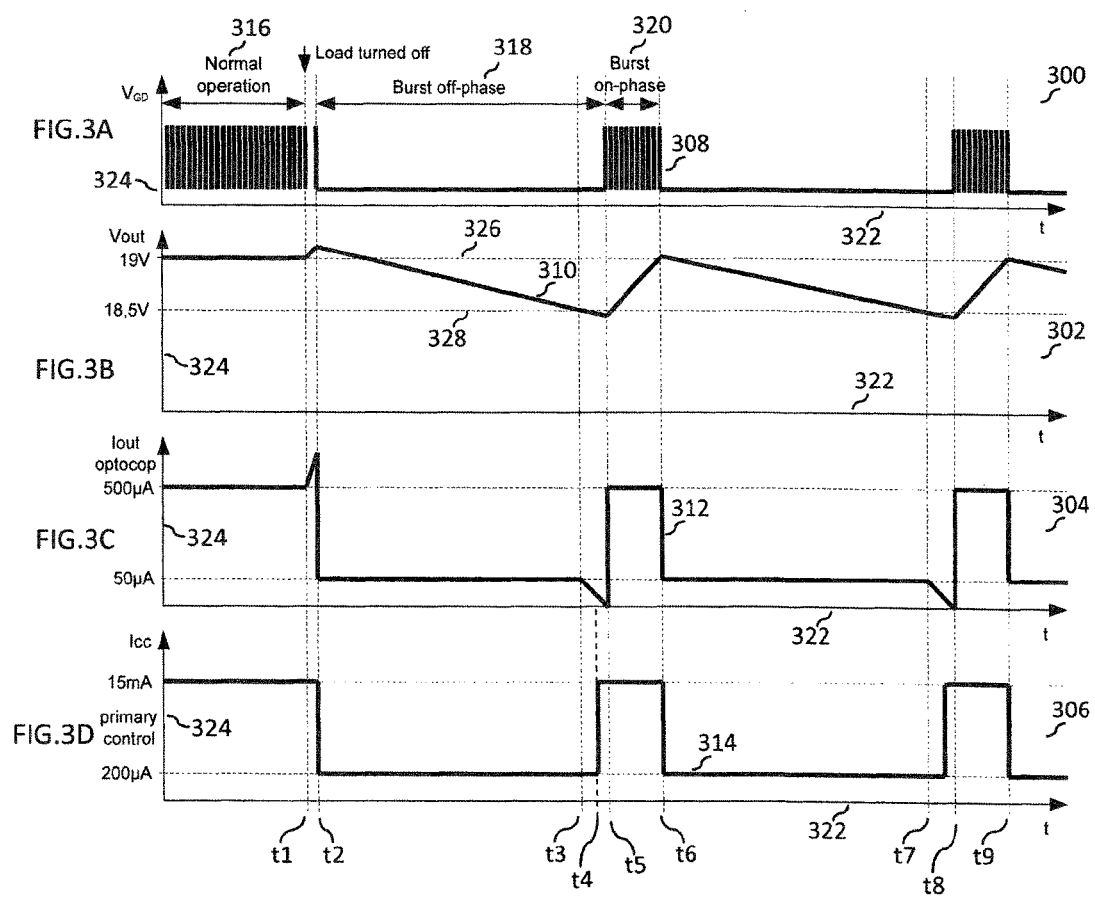

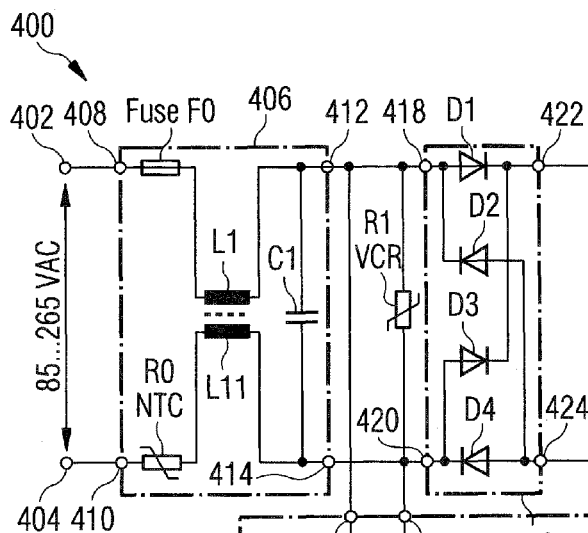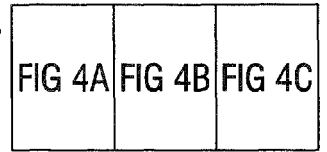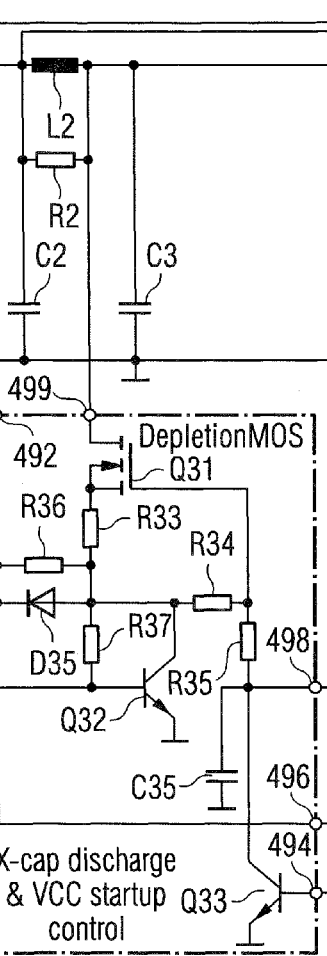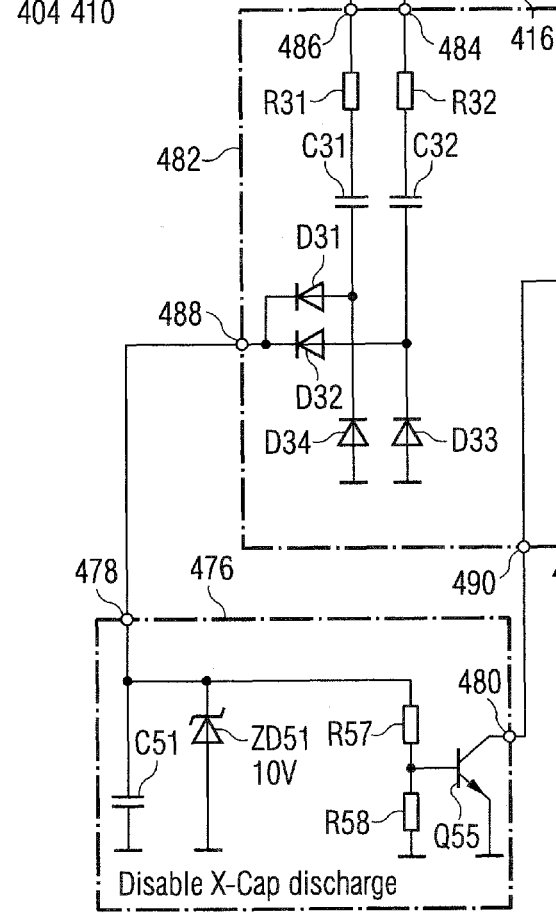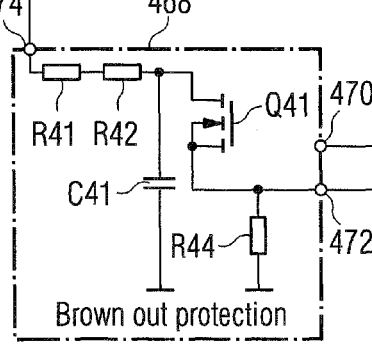

POWER CONVERTER WITH REDUCED POWER CONSUMPTION IN STANDBY MODE

TECHNICAL FIELD

In various embodiments a power converter with reduced power consumption in standby mode is provided.

BACKGROUND

One of the key aspects of SMPS (switched mode power supply) design may be seen in a reduced power consumption during standby mode, i.e. in an operation mode during which no load is connected to the SMPS, as well as during light load operation. Light load operation may be typically defined as an operation mode, during which a load is connected to the SMPS which corresponds to 5% or less of the nominal load of the SMPS.

A reduced power consumption and an increased efficiency during light load operation may be achieved by operating the SMPS in a burst mode. The burst mode is characterized by an on-phase usually lasting a few operating clock cycles during which the SMPS is in normal operation mode converting energy via a transformer and by an off-phase during which at least the power switches of the SMPS are turned off and no energy conversion takes place. In common SMPS various functionalities need to be upheld during the off-phase in the burst mode such that a significantly reduced power consumption of the SMPS during standby is not viable. For example, on the secondary side of the power converter an amplifier needs to be active constantly in order to determine the current load condition and transmit information with regard to the load condition to the primary side of the power converter. Thus, a receiver needs to be active on the primary side of the power converter in order to receive the information with regard to the load condition. Consequently, those and other control functions which need to remain active or be constantly upheld on the primary side and the secondary side of the power converter impose limitations on a possible reduction of the power consumption during the operation of the SMPS in burst mode, i.e. during standby. The burst mode is further limited by situations in which power consumption on the primary side is larger than the power consumption on the secondary side and the distribution of energy on the primary side and the secondary side during burst mode cannot take place according to need and the supply of energy on the primary side breaks down.

In further applications, SMPS are provided in which one optocoupler is used for transmitting a control signal and information about the burst mode from the secondary side to the primary side, wherein the receiving side of the optocoupler is provided with energy from one energy source, for example from a 5 V potential via a 23 kOhm resistor. In such a configuration, the current provided to the optocoupler tends to be too low as to prevent parasitic capacitances from affecting the signal transmission bandwidth during normal operation mode and it tends to be too high as to enable a further reduction of the overall power consumption of the SMPS during burst mode, which may be in the range of 0.5 mA to 1 mA, for example. There are also SMPS available which use more than one optocoupler for implementing communication between the primary side and the secondary side of the SMPS.

SUMMARY

In accordance with various embodiments a converter is provided, including: a transformer comprising a primary side and a secondary side; a primary side circuit arrangement coupled to the primary side of the transformer; a secondary side circuit arrangement coupled to the secondary side of the transformer, wherein the secondary side circuit arrangement is configured to provide at least one of an output voltage and an output current; a coupling component configured to provide information about at least one of the output voltage and the output current to the primary side circuit arrangement; a first energy supply configured to provide the coupling component with a first current; and second energy supply configured to provide the coupling component with a second current, wherein the second current is lower than the first current.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIGS. 3A to 3D show signal sequences within the converter according to various embodiments;

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Figure 1:
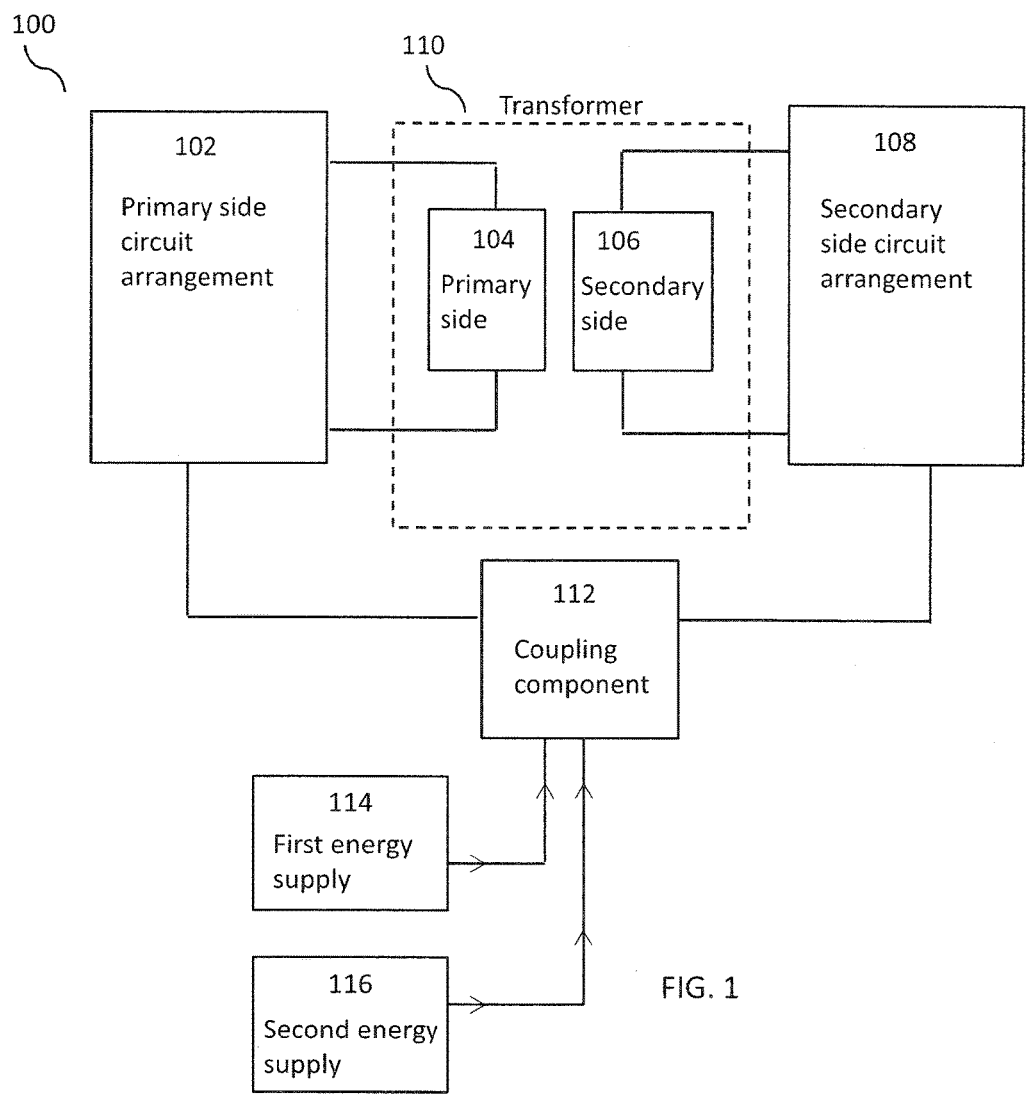
FIG. 1 shows a converter according to various embodiments.

FIG. 1 shows a basic schematic of the converter 100 according to various embodiments. The converter 100 may include a primary side circuit arrangement 102 and a secondary side circuit arrangement 108. The primary side circuit arrangement 102 may further include at least one input terminal (not shown in FIG. 1) to which an input voltage (or input current) be applied. Correspondingly, the secondary side circuit arrangement 108 may include at least one output terminal (not shown in FIG. 1) at which a converted voltage and/or a converted current may be provided to an external load, which may be coupled to the at least one output terminal of the converter 100 according to various embodiments. The output voltage (or output current) provided at the at least one output of the converter 100 may be a DC voltage (or a DC current). The input voltage (or input current) may be a DC voltage (or DC current) or an AC voltage (or AC current). In the first case, the converter 100 may be configured as a DC-DC converter, in the latter case, the converter 100 may hence be configured as an AC-DC converter.

The converter 100 according to various embodiments may further include a power stage, e.g. a transformer 110, which has a primary side 104 to which the primary side circuit arrangement 102 is coupled and a secondary side 106 to which the secondary side circuit arrangement 108 is coupled. The primary side 104 of the transformer 110 may include one or more primary windings, for example one or more primary inductances, and the secondary side 108 of the transformer 110 may have one or more secondary windings, for example one or more secondary inductances. The transformer 110 may further include a magnetic core, e.g. a ferromagnetic or ferrimagnetic core including a ferromagnetic or ferrimagnetic material, respectively, such as e.g. iron or a material (e.g. an alloy) including iron. In various embodiments, the primary side 104 of the transformer 110 and the secondary side 106 of the transformer 110 are galvanically separated from each other and inductively coupled with each other by means of the magnetic core which, for example, may run through the one or more primary windings (or inductances) and the one or more secondary windings (or inductances) such that the magnetic field generated by any one of the windings (or inductances) may affect every other winding (or inductance).

The converter 100 according to various embodiments may further include a coupling component 112 configured to provide information about at least one of the output voltage and the output current to the primary side circuit arrangement 102. The coupling component 112 may have a first side and a second side (not distinguished in FIG. 1), wherein the first side may be coupled to the primary side circuit arrangement 102 and galvanically separated from the second side which may be coupled to the secondary side circuit arrangement 108. In other words, the primary side circuit arrangement 102 and the secondary side circuit arrangement 108 may be electrically isolated from one another in the sense that exchange of particles carrying electrical charge from one between the primary side circuit arrangement 102 and the secondary side circuit arrangement 108 is prevented, i.e. no direct current flows between both circuit arrangements. However, energy or information may still be exchanged between the primary side circuit arrangement 102 and the secondary side circuit arrangement 108 (or vice versa) by other means, such as capacitance, induction, electromagnetic waves, such as light, or by acoustic or mechanical means, for example.

The converter 100 according to various embodiments may further include a first energy supply 114 configured to provide the coupling component 112 with a first current (or a first voltage). The first energy supply 114 may be coupled to the primary side circuit arrangement 102 and be configured to provide the receiving side of the coupling component 112 with the first current. The first energy supply 114 may be provided in a controller (not shown in FIG. 1) which may be arranged in the primary side circuit arrangement 102 and which may be configured to control the operation of the converter 100 according to various embodiments, for example control the operation of at least one power switch (not shown in FIG. 1) which is coupled to the primary side 104 of the transformer 110 and controls a current flow through the primary side 104 of the transformer 110. The first energy supply 114 may be a separate switchable current source or voltage source or it may be a circuit which is configured to derive a voltage or a current from the input voltage or input current of the converter 100 and to provide it to the controller and/or the first side of the coupling element 112.

The converter 100 according to various embodiments may further include a second energy supply 116 configured to provide the coupling component 112, e.g. the first side of the coupling component, with a second current (or a second voltage), wherein the second current is lower than the first current. The second energy supply 116 may be a separate switchable current or voltage source or it may be a circuit which is configured to derive a voltage or a current from the input voltage or input current of the converter 100 and to provide it to the coupling element 112. The second energy supply 116 may for example be a passive component and be charged during normal operation of the SMPS in order to provide energy to the receiving part, i.e. the first part of the coupling element 112 during the off-phase in burst mode.

The converter according to various embodiments may be configured as a forward converter or as a reverse converter. In various embodiments, the converter 100 may be configured as a converter such as a boost converter, a buck converter, a boost/buck converter and/or a flyback converter. In various embodiments, the converter may be configured as a half-bridge converter or as a full-bridge converter. In various further embodiments, the converter may be configured as a switch mode power supply converter. In various embodiments, the converter may be configured as a synchronous converter. In various embodiments, the converter may be configured as a multiphase converter, e.g. as a multiphase synchronous converter. In various embodiments, the converter may be configured as a push-pull converter. In various embodiments, the converter may be configured as a resonant converter, e.g. as a parallel resonant converter or as an LLC resonant converter.

Figure 2:
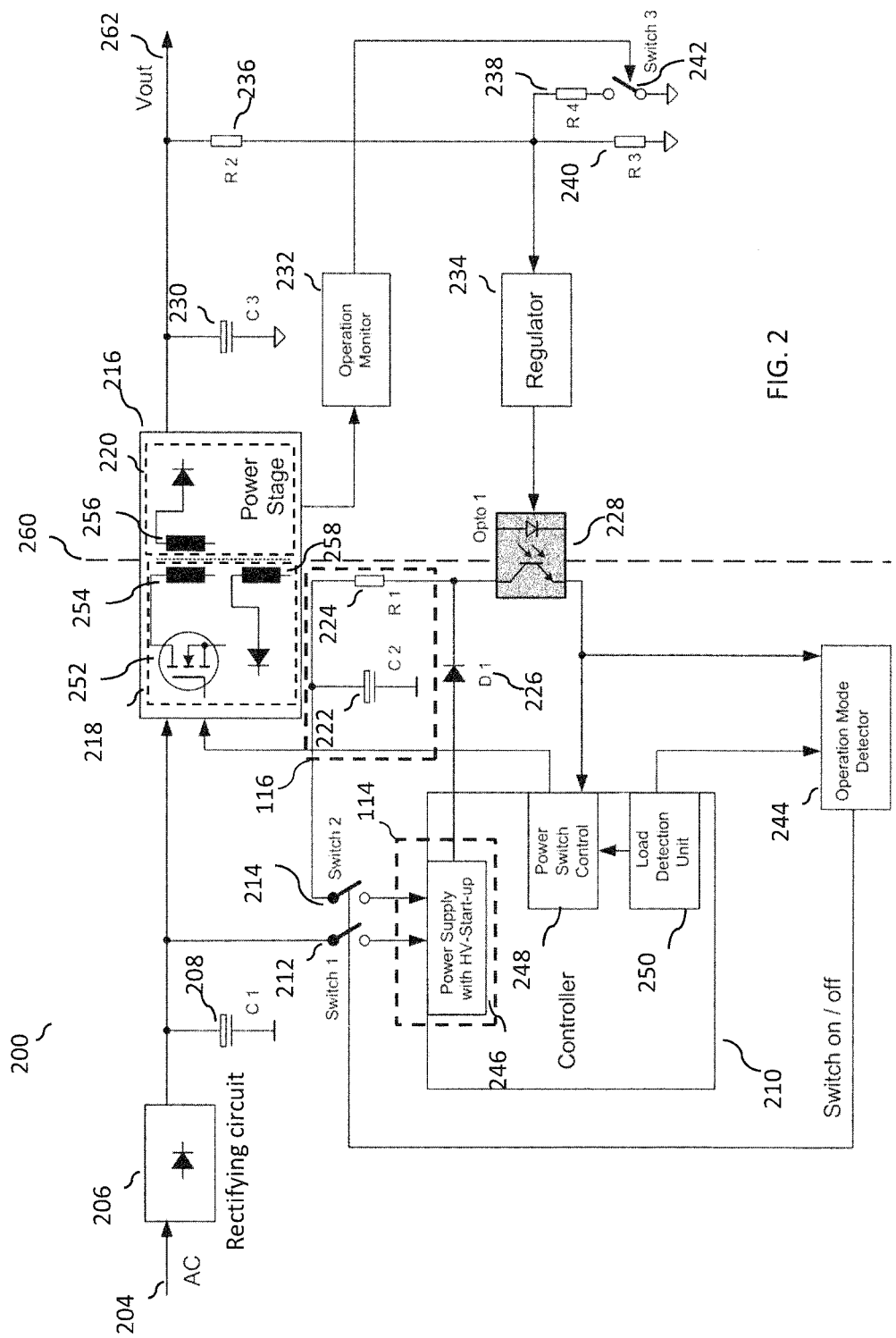
FIG. 2 shows an implementation of a converter according to various embodiments.

In FIG. 2 a further implementation of a converter 200 according to various embodiments is illustrated. The converter 200 includes a primary side circuit arrangement which corresponds to the part of the converter 200 located to the left of a separation line 260 and a secondary side circuit arrangement which corresponds to the part of the converter 200 located to the right of the separation line 260. The separation line 260 defines a primary side (to the left thereof) and a secondary side (to the right thereof) of the converter 200 according to various embodiments. An input path 204 is provided on the primary side circuit arrangement to which an input voltage (or input current) maybe coupled. The input path 204 is coupled to a rectifying circuit 206 which may be configured to rectify the input voltage (or current) in case an AC voltage (AC current) is applied to the converter 200. An output of the rectifying circuit 206 may be coupled to the primary side 218 of the transformer 216, for example to at least one power switch such as a transistor 252. The power switch may be coupled to a first winding 254 which is arranged on the primary side 218 of the transformer 216. A first capacitor 208 may be coupled between a reference potential, e.g. the ground potential, and the electrical path between the rectifying circuit 206 and the primary side 218 of the transformer 216. A second winding 258 may be provided on the primary side 218 of the transformer 216 and be magnetically coupled to the first winding 254 and a third winding 256 which is provided on the secondary side 220 of the transformer 216. The primary side 218 of the transformer 216 may be coupled to a second capacitor 222 and via a first resistor 224 to the first side, i.e. the receiving side of the coupling component 228 which, for example, may be configured as an optocoupler. The other side of the second capacitor 222 may be connected to the reference potential. The electrical path between the first resistor 224 and the first side of the coupling element 228 may be coupled to an output of a power supply with HV (high voltage) start-up circuit 246 which may be provided within the controller 210. A first input of the power supply with HV start-up circuit 246 may be connected to the electrical path between the first capacitor 208 and the transformer 216 via a first switch 212, for example a first transistor. A second input of the power supply with HV start-up circuit 246 may be connected to the electrical path between the primary side 218 of the transformer 216 and the second capacitor 222 via a second switch 214, for example a second transistor. A control output of an operation mode detector 244 may be coupled to the control terminal of the first switch 212 and to the control terminal of the second switch 214 for control of their state, i.e. for controlling whether the respective switch is in a conducting or non-conducting (isolating) state. The output of the receiving side of the coupling component 228 may be coupled to a first input of a power switch control circuit 248 which may be provided within the controller 210 and to a first input of the operation mode detector 244. An output of the power switch control circuit 248 may be coupled to the gate of the at least one transistor 252. A second input of the power switch control circuit 248 may be coupled to an output of a load detection circuit 250 which may be provided in the controller 210. An output of the load detection controller 250 may be coupled to a second input of the operation mode detector 244.

The third winding 256, for example a third inductance, arranged on the secondary side 220 of the transformer 216 may be coupled to a third capacitor 230 and to the output path 262 of the secondary side circuit arrangement, i.e. the output of the converter 200 according to various embodiments. The other side of the third capacitor 230 may be connected to signal ground. The secondary side 220 of the transformer 216 may be coupled to an input of an operation monitor 232 the output of which may be coupled to a control terminal of a third switch 242, for example a third transistor. The third switch 242 may be coupled between signal ground and a regulator circuit 234 via fourth resistor 238. The electrical path between the regulator circuit 234 and the fourth resistor 238 may be further coupled to signal ground via a third resistor 240 and to the output path 262 of the converter 200 via a second resistor 236. An output of the regulator circuit 234 may be coupled to the second side of the coupling element 228, i.e. the transmitting side thereof.

It is to be pointed out that the power supply and HV start-up circuit 246, the power switch control circuit 248 and the load detection circuit 250 may be provided as separate circuits outside of the controller 210 and in such a case be connected to corresponding terminals of the controller 210. Also, the operation mode detector 244 may be provided as a functional circuit or functional unit within the controller 250.

The power switch control circuit 248 may be configured to provide at least one switch control signal to the at least one switch 252 connected to the primary side 218 of the transformer 216. In various embodiments, the power switch control circuit 248 may be configured as a pulse width modulation (PWM) circuit or as a pulse frequency modulation (PFM) circuit. In accordance with the switch control signal, the at least one switch 252 may be rendered conducting or non-conducting and thereby connect or disconnect the input path 204 of the converter 200 according to various embodiments from the primary side 218 of the transformer 216, e.g. the first winding 254 thereof.

The power supply with HV start-up circuit 246 may be configured to provide power to the controller 210 and the first side of the coupling element 228 when the controller 210 is active. Furthermore, the power supply with HV start-up circuit 246 may be further configured to activate or start up the controller 210 after it has been deactivated, for example due to a detection of a light load connected to the output 262 of the converter 200 or during standby.

The load detection circuit 250 may be configured to detect the load condition, e.g. the power drawn by a load connected to the output 262 of the converter 200. In other words, the load detection circuit 250 may be configured to monitor the load condition during normal operation of the converter 200, detect fluctuations in the power drawn from the output 262 of the converter 200 and provide corresponding information to the power switch control circuit 248 which may adjust the amount of energy that is transferred from the primary side 218 to the secondary side 220 of transformer 220. The load detection circuit 250 may require information about the load condition from the secondary side circuit arrangement which it may receive via the coupling component 228.

The operation mode detector 244 may be configured to determine or detect the operation mode of the converter 200 according to various embodiments. In general, the converter 200 may be in one of two operational states. In the first state, the normal operation mode, the converter is fully active and the power conversion takes place such that during every clock cycle a portion of energy may be transmitted from the primary side 218 to the secondary side 220 of the transformer 220, wherein the clock cycle is adjusted in accordance with the power required by the load connected to the output path 262 of the converter 200. In the second operation mode, the burst mode, the operation may include phases of normal operation and phases during which at least the controller 210 is inactive. The converter 200 may operate in burst mode when a light load is connected to the converter 200 or in standby. In various embodiments of the converter 200, standby may be a state during which an input voltage (or input power) is provided to the converter but no load is connected. During standby, the controller 210 may be inactive and only the first side of the coupling component 228 and the operation mode detector may remain active in the primary side circuit arrangement. The operation mode detector 224 may be configured to wake up or reactive the controller, for example by closing (i.e. rendering conducting) the first switch 212 and/or the second switch 214, when the output voltage on the secondary side circuit arrangement drops below a threshold value and a corresponding signal indicating such an event is transmitted to the operation mode detection circuit 244 via the coupling component 228. The operation mode detector 224 may be configured to deactivate or shut down the controller 244, for example by opening the first switch 212 and/or the second switch 214, when the load detection circuit 250 detects that a light load or no load is connected to the output 262 of the converter 200 and a corresponding signal is provided from the load detection circuit 250 to the operation mode detection circuit 244.

The circuit modules which are shown to be provided in the controller 210 in FIG. 2 may be communicatively coupled with each other by a communication bus (not shown in FIG. 2). Furthermore, the communication bus may be coupled to a communication interface which is provided to establish electrical contact between the modules of the controller 210 and the surrounding circuitry the controller 210 might be embedded into. The communication interface may, for example, include pins or terminals to which external leads may be coupled. The one or more pins or terminals may be dedicated, i.e. solely provided for contacting a specific circuit module within the controller 210, or they can be coupled to more than one circuit module.

In various embodiments, the controller 210 may include a plurality of discrete circuit components (e.g. an analog controller including a plurality of discrete logic gates and/or analog amplifier(s)) which may be mounted on a printed circuit board, for example, such as e.g. one or more circuits as described above, or may be configured as a programmable controller (which may be monolithically integrated on a wafer substrate) such as e.g. a microcontroller (e.g. a reduced instruction set computer (RISC) microcontroller or a complex instruction set computer (CISC) microcontroller), or a field programmable gate array (FPGA), or a programmable logic array (PLA) or any other kind of logic circuit. The controller 210 or the primary side circuit arrangement may of course include further functional circuits or modules, for example a brown out protection circuit which may be configured to deactivate the controller when the input voltage (or input current) is too low to permit proper operation of the controller and/or a zero current detection circuit which may be configured to detect the event of disconnecting the input voltage (or input current) from the input path 204 of the converter 200 according to various embodiments.

The operation monitor 232 may be configured to monitor the state of the transformer 216 and to detect a state in which the power conversion is stopped, e.g. due to the deactivation of the controller 210 due to a disconnection of the external load from or due to the presence of a light load at the output 262 of the converter 200. The operation monitor 232 may be configured to monitor the output voltage of the converter 200 and provide a corresponding signal to the third switch 242 in case the output voltage drops below a predefined value.

The regulator circuit 234 may be configured to generate a signal that is transmitted to the primary side circuit arrangement by the coupling component 228. During normal operation, the regulator circuit 234 may generate a signal which indicates to the controller 210 whether more or less power is needed on the secondary side circuit arrangement. For example, a high signal level of the signal transmitted by the coupling component may indicate that the less power is to be provided at the output of the converter 200 whereas a low signal level may indicate that more power is to be provided at the output of the converter 200. In accordance with that information, the controller 210 may adjust the control signal provided to the at least one transistor 252 and thereby adjust the power provided at the output of the converter 200 to need. In burst mode, the regulator circuit 234 may be configured to compare the output voltage of the secondary side circuit arrangement to first threshold value and to a second threshold value. If the operation monitor detects that the output voltage exceeds the first threshold value, it may be configured to output a signal to the coupling component 228 which results in the deactivation of the controller 210 thereby rendering the converter 200 into the off-phase of the burst mode. If on the other hand the operation monitor detects that the output voltage drops below the second threshold value, it may be configured to output a signal to the coupling component 228 which results in the activation of the controller 210 thereby rendering the converter 200 into the on-phase of the burst mode, i.e. a phase during which the controller 210 and the primary side circuit arrangement operate in normal operation mode.

The switching between the first threshold and the second threshold may be initiated by the operation monitor 232 which may provide a switching signal to the third switch 242 which alters the value of the resistance of a compound resistor including the third resistor 240 and the fourth resistor 238 in a voltage divider including the compound resistor and the second resistor 236.

During the off-phase in burst mode the operation monitor 232 may be provided with insufficient energy as to be able to cause the third switch 238 (which may be configured to be open, i.e. non-conducting, by default) to close, i.e. become conducting, such that it remains opened, i.e. non-conducting. Therefore, the compound resistor assumes its larger resistance value and the regulator circuit 234 may sense a larger fraction of the output voltage which is equivalent to an internal reference voltage of the regulator circuit 234 being lowered which may correspond to the second threshold. When the output voltage drops below the second threshold, the regulator 234 may output a corresponding signal to the coupling component 228 which is transmitted to controller 210 (which, however, is inactive at this stage) and the operation mode detector 244 and may cause the operation mode detector 244 to activate the controller 210.

During the on-phase in the burst mode, when power is being transformed by the transformer, the operation monitor 232 may be provided with sufficient energy as to be able to cause the third switch 238 to close, i.e. become conducting. Therefore, the compound resistor assumes its smaller resistance value and the regulator circuit 234 may sense a smaller fraction of the output voltage which is equivalent to the internal reference voltage of the regulator circuit 234 being increased which may correspond to the second threshold. When the output voltage exceeds the first threshold value, the regulator 234 may output a corresponding signal to the coupling component 228 which may be interpreted by the load detection circuit 250 which thereupon may send a corresponding signal to the operation mode detector 244 which may cause the operation mode detector 244 to deactivate the controller 210. Put in other words, the regulator circuit 234 may be configured to compare, depending on the operation mode of the converter 200, different fractions of the output voltage to an internal threshold (or equivalently the same fraction of the output voltage to different internal thresholds) and adjust its output signal to the coupling component 228 depending on the result of the comparison. With the help of the operation monitor 232 which is configured to monitor the operation of the transformer 216 and thereby the operation of the converter 200, the threshold value may be increased or decreased to introduce a hysteresis into the regulator circuit 234 such that the controller 210 may be activated and deactivated at different voltage values of the output voltage. This process will be described in more detail on the basis of the diagrams shown in FIGS. 3A to 3D.

In various further embodiments, the switching between the first threshold 326 and the second threshold 328, which in accordance with the description given above, may be performed by switching the sampled fraction of the output voltage of the converter 200 according to various embodiments between two discrete values by the third switch 242, may be also implemented by making use of regulator dynamics of the regulator circuit 234. In other words, a delayed reaction of the regulator circuit 234 with respect to its input may be used in order to implement a hysteresis providing the effect as described above. In an implementation of the converter 200 according to various embodiments without the voltage divider and the third switch 242, the burst mode may be initiated as described above, for example by a corresponding signal output by the detection circuit 250 to the operation mode detector 244 which may open the first switch 212 and the second switch 214. The regulator circuit 234 may detect the slowly decreasing output voltage of the converter 200 and may be configured to adapt its output signal, i.e. react to its input signal, in order to "request" more energy from the primary side circuit arrangement of the converter 200. However, due to an internal delay, the regulator circuit 234 may be configured to react to its input signal in a delayed manner such that there is a time delay between the detection of the output voltage falling below an output threshold and the actual "request" of the regulator circuit 234 for more energy from the primary side circuit arrangement. The degree of delay may be adapted in accordance with a desired output voltage value at which the controller 210 is to be activated again to provide energy to the secondary side circuit arrangement in order to increase the output voltage of the converter 200 according to various embodiments. For example, the response delay of the regulator circuit 234 may be configured such that the time it takes the regulator circuit 234 to "request" energy from the primary side circuit arrangement corresponds to the time it takes the output voltage of the converter 200 to decrease from its nominal output voltage, for example 19V, to a certain output voltage value, for example 18.5 V. The internal delay may be configured taking into account various parameters defining the rate at which the output voltage of the converter 200 decreases in the off-phase of the burst mode, for example leakage currents and/or power consumption of circuit components which remain active during the off-phase of the burst mode. In an equivalent manner, once the on-phase in burst mode is entered, the delayed reaction of the regulator circuit 234 to the output voltage exceeding the nominal output voltage value may also result in a delayed deactivation of the controller 210 and hence the amount of energy delivered to the secondary side circuit arrangement may be slightly larger than the amount of energy required to restore the output voltage to its nominal value, for example 19V. In other words, due to the internal delay of the regulator circuit 234 the energy conversion by the transformer 216 (controlled by the controller 210) may be stopped (based on a corresponding signal from the regulator circuit 234) a certain time after the output voltage has increased to a certain value, for example to an output voltage of 19.2 V, which is larger than the nominal output value. In case the converter 200 according to various embodiments is in light load operation mode, the bust frequency, i.e. the number of transitions between off-state and on-state in burst mode in a given time, may increase. In other words, the regulator circuit 234 may operate in an oscillating state introducing a hysteresis with respect to the voltage output values at which the off-phase and the on-phase in burst mode are initiated. The turnaround points of the oscillation may, for example, may be set to correspond to the first threshold and the second threshold.

Depending on the state in which the converter 200 according to various embodiments is operated, the coupling component 228 may be operated in either of two operation modes. In normal operation mode, i.e. either when the controller 210 is active and an external load is connected to the output 262 of the controller 210 or during the on-phase of the burst mode, the coupling element 228 may be provided with energy (or current) by a first energy source which may include the power supply and HV start-up circuit 246 and the first diode 226. Therefore, both the controller 210 and the coupling component 228 may be provided with energy by the first energy source which may also be configured as an external switchable energy source coupled to the controller 210 and the coupling component 228 and which may be controlled by the operation mode detector 244. In any case, the first energy source may be configured to provide energy to the coupling component 228 and the controller 210 during normal operation of the converter 200. The energy provided to the coupling component 228 during normal operation mode of the converter 200 may be large enough such that the coupling component 228 may offer full communication bandwidth. During normal operation mode, an amplitude change of the signal transmitted by the coupling component 228 may indicate to the controller 228 by which amount the power provided from the primary side circuit arrangement to the secondary side circuit arrangement is to be increased or decreased. Accordingly, the controller 210, e.g. the power switch control circuit 248, may adjust the signal driving the at least one switch 252 and thereby adjust the amount of power provided at the output of the converter 200.

In the second operation mode the converter 200 operates in burst mode which includes on-phases and off-phases. During the on-phase in burst-mode, the operation of the converter 200 corresponds to its operation in normal operation mode. During the off-phase in burst mode, the controller 210 is inactive. The first energy source may be inactive during the off-phase in burst mode, as it may be provided as an internal energy source in the controller 210 which is deactivated during that phase or because it is deactivated as an external switchable energy source by a corresponding signal from the operation mode detector 244. During the off-phase in burst mode, the coupling component 228 may be provided with energy from the second energy source which in the implementation of the converter 200 according to various embodiments shown in FIG. 2 includes the second capacitor 222 and the first resistor 224. The current provided by the second energy source to the coupling component 228 is smaller than the current provided thereto by the first energy source. Therefore, the coupling component 228 may offer a reduced communication bandwidth during the off-phase in burst mode. For example, the coupling component 228 may be configured to either uphold its output signal at a predefined value when the controller 210 is to remain deactivated, i.e. when it is to remain in the off-state in burst mode, or let the amplitude of the output signal drop to zero when the controller 210 is to be activated. In other words, during the off phase in burst mode, the coupling component 228 may be configured as a two state detector and be able to transmit or indicate two states or conditions from the secondary side circuit arrangement to the primary side circuit arrangement, for example to the controller 210. The amplitude of the signal output by the coupling component 228 may by defined by a current flowing therethrough. During the off-phase of the burst mode the operation mode detector 244 may be configured to activate the controller, as soon as it detects a drop of the amplitude of the signal output by the coupling component 228 below a certain threshold. The operation mode detector circuit 244 may detect the operation state of the converter 200 by checking whether the controller 210 is active or not. This may be performed by monitoring the state of the first switch 212 and the second switch 214 which, if in non-conducting state, may indicate that the controller 210 is inactive and hence that the converter 200 is in the off-phase of the burst mode, or by interpreting the signal which the operation mode detector circuit 244 may receive from the load detection circuit 250 of the converter 200 where, for example, a zero value of the signal may indicate that the controller 210 is inactive and hence that the converter 200 is in the off-phase of the burst mode.

In FIGS. 3A to 3D signal sequences during the operation of a converter 200 according to various embodiments are shown. In diagram 300 of FIG. 3A, an exemplary switch control signal 308 is illustrated which may be provided by the switch control circuit 248 to the at least one switch 252 connected to the primary side 218 of the transformer 216. The x-axis 322 denotes time in arbitrary units, the y-axis 324 denotes the signal amplitude, for example a voltage of the switch control signal 308 ($V_{GA}$). A high signal value of the switch control signal 308 may render the at least one switch 252 conducting whereas a low signal value of the switch control signal 308 may render the at least one switch 252 non-conducting. In diagram 302 of FIG. 3B an exemplary output voltage 310 of the converter 200 according to various embodiments is illustrated. The x-axis 322 denotes time in arbitrary units, the y-axis 324 denotes the signal amplitude, in this case a voltage of the output signal 310 ($V_{out}$). In this exemplary scenario, the converter according to various embodiments is configured to provide an output voltage of approximately 19 V and it is configured to transition from the off-phase into an on-phase during burst mode when the output voltage drops below approximately 18.5 V. In other words, the first threshold value may be equal to approximately 19 V and the second threshold value may be equal to approximately 18.5 V. In diagram 304 of FIG. 3C an exemplary output signal 312 of the coupling component 228 is illustrated, for example an output current 312 ($I_{out\_optocop}$) of the first side of the coupling component 228 which may be configured as an optocoupler. The x-axis 322 denotes time in arbitrary units and the y-axis 324 denotes a current. In this exemplary scenario, the optocoupler is configured to work in the range of approximately 500 µA to in the first operation mode, e.g. the normal operation mode and the on-phase during burst mode, and to uphold a current of approximately 50 µA to during the off-phase of the burst mode, when the controller 210 is to remain deactivated. In diagram 306 of FIG. 3D an exemplary current, for example a supply current 314 ($I_{CC}$), provided to and consumed by the primary side circuit arrangement including the controller 210 is illustrated. The x-axis 322 denotes time in arbitrary units and the y-axis 324 denotes a current. In this exemplary scenario, the primary side circuit arrangement including the controller 210 consumes approximately 15 mA during the first operation mode and approximately 200 µA to during the off-phase in burst mode. The time axes 322 of all diagrams in FIGS. 3A to 3D are synchronized. It is further to be noted that the absolute values used in the diagrams shown in FIGS. 3A to 3D merely serve the purpose of illustration and may vary depending on the actual implementation of the converter according to various embodiments.

Up to a first time t1, the converter 200 according to various embodiments operates in normal operation mode 316. The switch control signal 308 is modulated in accordance with a PWM or a PFM scheme and energy is provided at the output 262 of the converter 200 according to various embodiments. The circuitry on the primary side of the converter circuit, e.g. the controller 210, controls the at least one power switch 252 in accordance with information which is provided to the controller 210 from the regulator circuit 234 via the coupling component, e.g. the optocoupler 228. During that phase, the output voltage 310 corresponds to approximately 19 V, the optocoupler output current 312 corresponds to approximately 500 µA and is constant, which may indicate a constant power consumption at the output 262 of the converter 200 according to various embodiments. Up to the first time t1 the primary side circuit arrangement including the controller 210 is in normal operation mode and draws a supply current 314 of approximately 15 mA. During that phase, the optocoupler 228 is provided with energy from the first energy source, e.g. from the controller 210 via the diode 226, as the first energy source is provided in the exemplary converter 200 shown in FIG. 2 in the form of the power supply and HV start-up circuit 246.

At the first time t1, the external load is turned off or disconnected from the output 262 of the converter 200 according to various embodiments. The output voltage 310 increases stating at the exemplary nominal output voltage of 19 V. The regulator circuit 234 drives the optocoupler 228 such that its output current 312 increases. The primary side circuit arrangement including the controller 210 is still active, hence it keeps drawing a current of approximately 15 mA.

At a second time t2, the controller 210 detects that the output current 312 of the optocoupler 228 exceeds an internal threshold which may indicate that too much power is provided at the output or that the power provided at the output is not drawn by a load connected thereto. The controller 210 may output a signal to the operation mode detector 244 such that the operation mode detector 244 renders the first switch 212 and the second switch 241 non-conducting. Thereupon the controller 210 is deactivated and the at least one power switch 252 may receive a low switch control signal and disconnect the input path 204 of the converter 200 from the primary side 218 of the transformer 216. In other words, at the second time t2 the converter 200 according to various embodiments is put into standby mode or enters burst mode which begins with the off-phase. Starting at the second time t2, the output voltage drops as the third capacitor 230 is slowly discharged providing energy to the regulator circuit 232. The optocoupler 228 is provided with energy from the second energy source, for example by current from the second capacitor 222 via the first resistor 224. As the second energy source is configured to provide less energy to the optocoupler 228 than the first energy source, the output current 312 of the optocoupler 228 drops to a different value, e.g. 50 µA, as indicated in diagram 304 of FIG. 3C. During the off-phase, the controller 210 and other circuit components on the primary side circuit arrangement may be deactivated, therefore the supply current to the primary side circuit arrangement drops to a lower value compared with its value during normal operation mode, e.g. to 200 µA.

Between the second time t2 and the third time t3 the converter according to various embodiments may be in the off-state 318 of the burst mode. During this time, a substantial part of the primary side circuit arrangement is deactivated, i.e. it does not consume any power. The operation mode detector 244 may remain active to monitor the output current 312 of the optocoupler 228 in order to decide whether the primary side circuit arrangement is to be powered and the controller 210 to be reactivated. During the off-state 318 the operation monitor 232 is not provided with power from the secondary side 220 of the transformer 232 and therefore the third switch is rendered into a non-conducting state and the voltage divider including the second resistor 236 and the regulator circuit 234 samples a bigger fraction of the output voltage which corresponds to the output voltage being compared to a lower threshold value, e.g. the second threshold value 328 which in the exemplary scenario corresponds to approximately 18.5 V.

During the off-phase 318 in the burst mode, the operation monitor 232 may be configured to monitor the output voltage 310 and compare it to the second threshold value 328. When the output voltage 310 does not drop below the second threshold value 328, the regulator circuit 234 is configured to drive the optocoupler 228 such that it is able to maintain its output signal 312 a low and stable value, for example a predefined value of 50 μA, as indicated in diagram 304 of FIG. 3C.

At a third time t3, the output voltage 310 begins to drop below the second threshold value 328. The regulator circuit 234 which is configured to detect this event adjusts its output signal to the second (transmitting) side of the optocoupler 228 such that on its first (receiving) side the output current 312 starts to decrease and reaches a zero value at a fifth time t5. In other words, the regulator circuit 234 may be configured to transmit a "wake up" signal to the primary side circuit arrangement by which the controller 210 may be reactivated. In this exemplary scenario the "wake up" signal corresponds to a very low output current of the optocoupler 228 which lies well below the predefined value of 50 μA. The operation mode detector 224 is configured to detect when the optocoupler output current 312 drops below that predefined value and reaches zero. For practical reasons, for example due to a dark current of the optocoupler 228, the operation mode detector 224 may be configured to detect when the optocoupler output current 312 drops below the predefined value and reaches a value between the predefined value and zero. In the exemplary scenario shown in diagram 304 of FIG. 3C, where the predefined value corresponds to 50 μA, the operation mode detector 224 may be configured to detect when the optocoupler output current 312 drops below a current value in the range between, for example, 5 μA to 30 μA, for example below a current value of 20 μA.

At a fourth time t4 such an event takes place, i.e. the operation mode detector 224 detects that the optocoupler output current 312 drops below the exemplarily chosen 20 μA. Upon the detection of such an event, the operation mode detector 244 may be configured to render the first switch 212 and/or the second switch 214 conducting such that the controller 210 and possibly other circuit components in the primary side circuit arrangement are reactivated at the fourth time t4. Therefore, the controller 210 or the converter 200, respectively, enters the on-phase during burst mode at the fourth time t4, which substantially corresponds to the normal operation mode of the converter 200 according to various embodiments. The time span between the fourth time t4, where in diagram 306 in FIG. 3D it can be seen that the supply current 314 of the primary side circuit arrangement returns to its value form the normal operation mode, and the fifth time t5, where other parameters such as the optocoupler output current 312 and the switch control signal 308 return to their states from the normal operation mode and/or where the output voltage 310 starts to increase may represent an internal response time of the primary side circuit arrangement.

Between the fifth time t5 and the sixth time t6, the converter is in the on-phase of the burst mode. During that time, the controller 210 drives the at least one power switch 252 such that power is converted in the transformer 216. The operation monitor is provided with energy again and renders the third switch 242 conducting. This alters the sample value of the output voltage provided by the voltage divider to the regulator circuit 234 to a lower value which may be seen to be equivalent to a situation in which the output voltage is compared to a higher threshold, for example to the first threshold 326 which in this exemplary scenario corresponds to approximately 19 V. The controller 210 which is provided with the output signal from the optocoupler 228 is fully operable between the fifth time t5 and the sixth time t6.

When the controller 210 detects an increasing optocoupler output current 312 or when the controller 210 detects that the optocoupler output current 312 has remained at a high value for a certain amount of time, the controller 210 may be configured to adjust its output to the operation mode detector circuit 244 to indicate that a transition into the off-phase of the burst mode is to take place. This may be observed at the sixth time t6, where the controller 210 and substantial parts of the primary side circuit arrangement are deactivated. The following events taking place at a seventh time t7, an eighth time t8 and a ninth time t9 will not be described again as they correspond to the events taking place at the second time t2, the third time t3 and the fifth time t5.

According to various embodiments of the converter 200, the off-phase during burst mode may be on the order of several second, for example 5 seconds, and the on-phase during burst mode may be on the order of a few tens of milliseconds, for example 20 milliseconds.

As described above, the primary side circuit arrangement which may be configured to provide control functionality of the converter 200 according to various embodiments during normal operation of the converter according to various embodiments may be completely deactivated except for detection circuitry, which may be operated with a minimal current, for example current from the second energy source, and be configured to monitor the signal provided by the coupling component 228, for example an optocoupler, from the secondary side circuit arrangement and reactivate the primary side circuit arrangement. The detection circuitry may include the optocoupler 228 and the operation mode detector 244.

According to various embodiments of the converter 200, in the off-phase during burst mode approximately 50 μA may be needed for the operation of the coupling component 228 and approximately 50 μA may be needed for the detection mode detector and the corresponding activating/deactivating functionality thereof. The signal from the regulator circuit 234 which is transmitted via the coupling component 228 and used to control the power conversion during normal operation mode and the "wake up" signal at the end of an off-phase in burst mode are transmitted via only one coupling element 228. For the transmission of control information from the secondary side circuit arrangement and for the signal bandwidth which is necessary and the processing thereof more energy, for example a higher current, may be needed than for the transmission of a simple operation status, for example either indicating that the controller 210 is to be activated or indicating that the controller 210 is to be deactivated. For this reason, the coupling component 228 or the first (receiving) side thereof, respectively, may be provided with energy, for example current or voltage, from two energy sources. In normal operation mode (i.e. also in burst mode during the on-phase) a switchable first energy source may provide the first (receiving) side of the coupling component 228 with energy. During the off-phase in burst mode the switchable first energy source and most of the primary side circuit arrangement may be deactivated and a "minimal energy" energy source, e.g. the second energy source may provide energy to the first side, i.e. the receiving side, of the coupling component 228. Thus, the detection circuitry in the primary side circuit arrangement is able to detect the "wake up" signal from the secondary side circuit arrangement and to reactivate the primary side circuit arrangement accordingly. In order to transition from the normal operation mode into burst mode, the regulator circuit 234 may control the optocoupler 228 to transmit a high signal value to the primary side circuit arrangement, i.e. control the optocoupler 228 such that it permits or generates a high current flow as its output signal on its first side. A high output signal from the optocoupler 228 on the primary side of the converter circuit according to various embodiments may, for example, indicate to the controller to control the at least one power switch 252 such that the portions of energy transmitted from the primary side 218 to the secondary side 220 of the transformer 216 become smaller or that they are completely suppressed, i.e. that the converter 200 according to various embodiments is to enter into standby mode. In other words, the controller 210 may be configured to detect when the flow of energy from the primary side 218 to the secondary side 220 of the transformer 216 is to be paused from the signal level of the output signal of the optocoupler 228.

The reaction of the primary side circuit arrangement, e.g. the controller 210, to the information received from the regulator circuit 232 when burst mode is to be initiated may be combined with further control information. For example, the duration (temporal length) of the control pulses in the switch control signal 308 to be skipped or the state of further converter stages, e.g. a state of the PFC (power factor correction) stage within the primary side circuit arrangement, may be taken into account in order to prevent the converter 200 according to various embodiments from erroneously reacting to transient effects.

According to various embodiments of the converter 200, the operation monitor 232 is configured, for example by controlling a switch, to switch the reference voltage provided to the regulator circuit 234 or to switch the voltage divider used to sample the output voltage of the converter 200 according to various embodiments after the lack of control pulses in the switch control signal 308 in order to introduce a hysteresis threshold when the converter 200 according to various embodiments operates in burst mode. In burst mode the output voltage may fluctuate within a range defined by the hysteresis, for example defined by the first threshold 326 and the second threshold 328, and the converter 200 according to various embodiments may operate as a two-position or two-point controller with autonomous adaptation to load conditions during burst mode. In other words, the regulator circuit 234 may be operated as a two-point controller in burst mode, wherein the output voltage fluctuates between a first voltage, for example the first threshold value 326, and a second voltage, for example the second threshold value 328, wherein the difference between the first voltage and the second voltage defining the output voltage ripple may be adjusted according to need, for example by a proper choice of the resistors included in the voltage divider via which the output voltage is sampled by the regulator circuit 234. This feature may enable the converter 200 according to various embodiments to reach a high efficiency even at low output powers, wherein during burst mode the burst frequency and the duty cycle with respect to the off-phase and the on-phase may be adjusted autonomously depending on the load (condition).

According to various embodiments of the converter 200 the secondary side circuit arrangement may be used to reduce the energy demand, e.g. the current demand, of the coupling component 228 during the off-phase in burst mode in comparison to the energy demand thereof in normal operation mode, such that the overall power consumption of the converter 200 according to various embodiments may be further reduced.

In case a status indicator such as an LED based status indicator is used, it may be coupled in series with the coupling component 228, in order to prevent an increase of power consumption on the secondary side circuit arrangement.

In various embodiments of the converter 200, the coupling component 200 may be also configured as a coreless transformer which may include two metal windings and silicon oxide insulation therebetween. In principle the coupling element may be any means offering transmission of information and electric isolation between the sending side and the receiving side thereof.

Figure 4B:
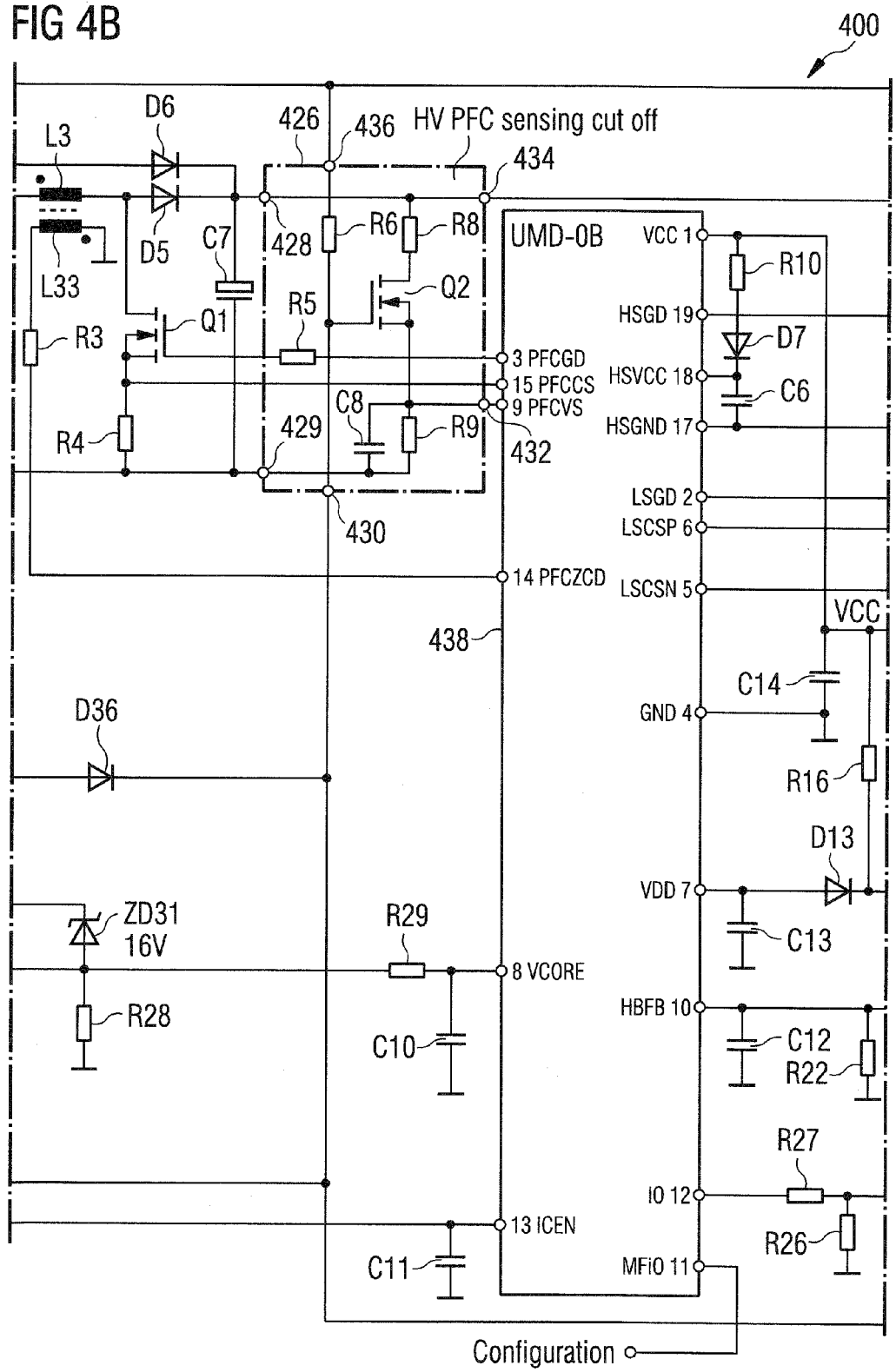
FIG. 4 shows a further implementation of a converter according to various embodiments.
Figure 4C:
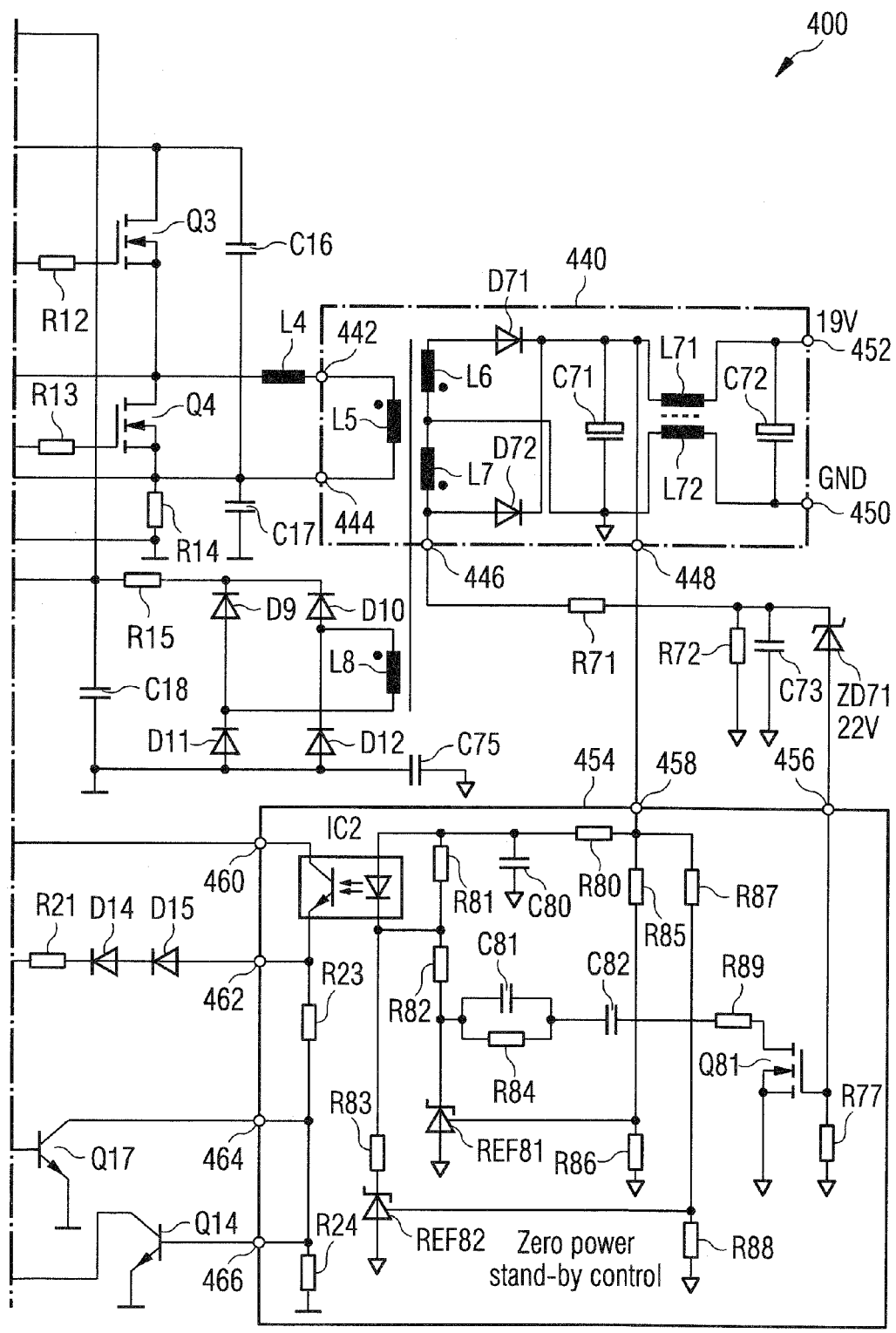

FIG. 4 shows a more detailed implementation of the converter 200 shown in FIG. 2. The converter 400 according to various embodiments has a first input terminal 402 and a second input terminal 404. The first input terminal 402 of the converter 400 is connected to a first terminal 408 of an input circuit 406 and a second input terminal 404 of the converter 400 is connected to the second terminal 410 of the input circuit 406. A series arrangement comprising a first resistor F0 and a first inductance L1 is coupled between the first terminal 408 and a fourth terminal 412 of the input circuit 406. The first resistor F0 may be configured as a fuse, i.e. a low resistance resistor that acts as a sacrificial device to provide overcurrent protection. A series arrangement comprising a second resistor R0 and a second inductance L11 is coupled between the second terminal 410 and a third terminal 414 of the input circuit 406. The second resistor R0 may be a NTC (negative temperature coefficient) resistor and hence have a resistance that is dependent on its temperature. The first inductance L1 and the second inductance L11 may be magnetically coupled, e.g. by a common core. A first capacitance C1 may be coupled between the third terminal 414 and the fourth terminal 412 of the input circuit 406. The fourth terminal 412 of the input circuit 406 is coupled to a second terminal 486 of a discharge and start-up circuit 482 and to a first terminal 418 of the rectifying circuit 416. The third terminal 414 of the input circuit 406 is coupled to a second terminal 420 of the rectifying circuit 416. A third resistor R1 is coupled between the first terminal 418 and the second terminal 420 of the rectifying circuit 416. The third resistor R1 may be a VCR (voltage controlled resistor), i.e. an element whose resistance is dependent on the voltage that is applied to it. The second terminal 420 of the rectifying circuit 416 is coupled to a first terminal 484 of the discharge and start-up circuit 482. Within the rectifying circuit 416 an arrangement of four diodes (a first diode D1, a second diode D2, a third diode D3 and a fourth diode D4), which is also referred to as a diode bridge or bridge rectifier is coupled between the first terminal 418, the second terminal 420, a third terminal 424 and a fourth terminal 422 of the rectifying circuit 416. The fourth terminal 422 of the rectifying circuit 416 is coupled to one side of a third inductance L2, one end of a fourth resistor R2 and one side of a second capacitance C2 and one side of a sixth diode D6. The other end of the third inductance L2 is coupled to the other side of the fourth resistor R2, one side of a third capacitance C3, and via a fourth inductance L3 and a fifth diode D5 to one side of a fourth capacitance C7, a first terminal 428 of a PFC (power factor correction) sensing cut off circuit 426, and to the other side of the sixth diode D6. The other side of the second capacitance C2 and the other side of the third capacitance C3 are coupled to the third terminal of the rectifying circuit 416. The third terminal 424 of the rectifying circuit 416 is further coupled to one end of a sixth resistor R4, the other side of the fourth capacitance C7 and to a sixth terminal 429 of the PFC sensing cut off circuit 426.

The other side of the sixth resistor R4 is coupled to one terminal of a first switch Q1, the other terminal of the switch Q1 is coupled to the electrical path between the fourth inductance L3 and the fifth diode D5. The electrical path between the sixth resistor R4 and the first switch Q1 is coupled to a seventeenth terminal PFCCS of a controller 438. A control terminal of the first switch Q1 is connected to an eighteenth terminal PFCGD of the controller 438 via a seventh resistor R5. The first switch Q1 may be configured as a MOSFET, for example a self-insolating MOSFET. The electrical path between the third terminal 424 of the rectifying circuit 416 and the sixth terminal 429 of the PFC sensing cut off circuit 436 is further coupled to a reference potential, for example the ground potential. The electrical path between the third inductance L2 and the fourth resistor R2 is coupled to a ninth terminal 499 of the discharge and start-up circuit 482. The fourth inductance L3 is magnetically coupled, for example by a common core, for example by a common copper core, to a fifth inductance L33. One side of the fifth inductance L33 is coupled to the reference potential, the other side of the fifth inductance RL33 is coupled to a fifteenth terminal PFCZCD of the controller 438 via a fifth resistor R3. The first terminal 428 of the PFC sensing cut off circuit 436 is coupled to one side of an eighth resistor R8 and a fourth terminal 434 of the PFC sensing cut off circuit 436. The other side of the eighth resistor R8 is coupled to one side of a second switch Q2, the other side of which is coupled to a third terminal 432 of the PFC sensing cut off circuit 426 and to the sixth terminal 429 of the PFC sensing cut off circuit 426 via a parallel arrangement including a ninth resistor R9 and a fifth capacitance C8. The third terminal 432 of the PFC sensing cut off circuit 426 is coupled to a sixteenth terminal PFCVS of the controller 438. A control terminal of the second switch Q2 is coupled to a fifth terminal 436 of the PFC sensing cut off circuit 426 via a seventh resistor R6 and to a second terminal 430 of the PFC sensing cut off circuit 426. The second switch Q2 may be configured as a MOSFET, for example a self-isolating MOSFET. The fifth terminal 436 of the PFC sensing cut off circuit 426 is coupled to a fifth terminal 492 of the discharge and start-up circuit 482 and to the first terminal VCC of the controller 438, via a ninth capacitance C14 to the eighth terminal GND of the controller 438, to one side of a fourteenth resistor R15, to the reference potential via a tenth capacitance C18, and to one side of a fifteenth resistor R16. The other side of the fifteenth resistor R16 is coupled to a first terminal 460 of a regulating circuit 454 and to a ninth terminal VDD of the controller 438 via a sixteenth diode D13. The eighth terminal GND of the controller 438 is coupled to signal ground, the ninth terminal VDD of the controller 438 is coupled to signal ground via a seventeenth capacitance C13. The fourth terminal 434 of the PFC sensing cut off circuit 426 is coupled to one terminal of a third switch Q3 and to the reference potential via a seventh capacitance C16 and an eighth capacitance C17. The other terminal of the third switch Q3 is coupled to a fourth terminal HSGND of the controller 438, to one terminal of a fourth switch Q4 and to a first terminal 442 of a transforming circuit via a sixth inductance L4. The first terminal 442 of the transforming circuit is coupled to one side of a seventh inductance L5. The other side of the seventh inductance L5 is coupled to a second terminal 444 of the transforming circuit 440 which is coupled to the electrical path between the seventh capacitance C16 and the eighth capacitance C17. A control terminal of the third switch Q3 is coupled to a second terminal HSGD of the controller 438 via an eleventh resistor R12. The other terminal of the fourth switch Q4 is coupled to a sixth terminal LSCSP of the controller 438, and to a seventh terminal LSCSN of the controller 438 via a thirteenth resistor R14. The seventh terminal LSCSN of the controller 438 is further coupled to the reference potential. The control terminal of the fourth switch Q4 is coupled to a fifth terminal LSGD of the controller 438 via a twelfth resistor R13. The first terminal VCC of the controller 438 is coupled to a third terminal HSVCC of the controller 438 via a tenth resistor or ten and a seventh diode D7. The third terminal HSVCC is coupled to the fourth terminal HSGND via a sixth capacitance C6. The third switch Q3 and the fourth switch Q4 may be configured as MOSFET, for example as self-isolating MOSFET. The other end of the fourteenth resistor R15 is coupled to signal ground via a series arrangement comprising an eighth diode D9, a tenth diode D11 and an eleventh capacitor C75 and to the electrical path between the tenth diode D11 and the eleventh capacitance C75 via a series arrangement comprising a ninth diode D10 and an eleventh diode D12. The electrical path between the ninth diode D10 and the eleventh diode D12 is coupled to the electrical path between the eighth diode D9 and the tenth diode D11 via a tenth inductance L8. The seventh inductance L5 and the tenth inductance L8 may form a primary side of a transformer T1 and may be magnetically coupled, for example by a common core. A second side of the transformer T1 is formed by an eighth inductance L6 and a ninth inductance L7 which are magnetically coupled to one another and to the seventh inductance L5 and the tenth inductance L8, for example by the common core which already couples the seventh inductance L5 and the tenth inductance L8 magnetically to one another. The seventh inductance L5 and the tenth inductance L8 are arranged on the primary side circuit arrangement. The eighth inductance L6 and the ninth inductance L7, which are coupled in series electrically, are provided in the secondary side circuit arrangement. The seventh inductance L5, the eighth inductance L6 and the ninth inductance L7 may be included in the transforming circuit 440. One side of the eighth inductance L6 is coupled to a first output 452 of the transforming circuit 440 via a twelfth diode and an eleventh inductance L71. The other side of the eighth inductance L6 is coupled to the electrical path between the twelfth diode D71 and the eleventh inductance L71 via a series arrangement including the ninth inductance L7 and the thirteenth diode D72 and to a second output 450 of the transforming circuit 440 via a twelfth inductance L72. The electrical path between the eighth inductance L6 and the ninth inductance L7 may be coupled to signal ground and to the electrical path between the twelfth diode D71 and the eleventh inductance L71 via a twelfth capacitance C71. A thirteenth capacitance C72 may be provided coupled between the first output 452 and the second output 450 of the transforming circuit 440. The side of the ninth inductance L7 not coupled to the eighth inductance L6 is coupled to the third terminal 446 of the transforming circuit 440. The third terminal 446 of the transforming circuit 440 is coupled to a fifth terminal 456 of the regulating circuit 454 via a series arrangement including a sixteenth resistor R71, a fourteenth diode D73 and a fifteenth diode ZD71. A seventeenth resistor R72 is coupled between signal ground and the electrical path between the fourteenth diode D73 and the fifteenth diode ZD71. A fourteenth capacitance C73 is coupled between signal ground and the electrical path between the fourteenth diode D73 and the fifteenth diode ZD71. The electrical path between the twelfth diode D71 and the eleventh inductance L71 within the transforming circuit 440 is coupled to a fourth terminal 448 of the transforming circuit 440. The fourth terminal 448 of the transforming circuit 440 is coupled to a sixth terminal 458 of the regulating circuit 454. A second terminal 462 of the regulating circuit 454 is coupled to a tenth terminal HBFB of the controller 438 via a series arrangement including a nineteenth diode D15, an eighteenth diode D14 and a thirty-third resistor R21. The tenth terminal HBFB of the controller 448 is further coupled to the ground potential via an eighteenth capacitance C12. A thirty-fourth resistor R22 is coupled between the reference potential and the electrical path between the thirty-third resistor R21 and the eighteenth capacitance C12. A third terminal 464 of the regulating circuit 454 is coupled to one terminal of a seventh switch Q17, the other terminal of which is coupled to the reference potential. The control terminal of the seventh switch Q17 is coupled to signal ground via a thirty-first resistor R26 and to an eleventh terminal IO of the controller 438 via a thirty second resistor R27. The controller 438 is provided with a twelfth terminal MFIO for configuration of the controller 438. The fifth terminal 456 of the regulating circuit 454 is coupled to a control terminal of a fifth switch Q81, which may be configured as a self-isolating MOSFET, and to signal ground via an eighteenth resistor R77. One terminal of the fifth switch Q81 is coupled to signal ground, the other terminal thereof is coupled to signal ground via a nineteenth resistor R89 and a twenty-second resistor R86, to one side of a fifteenth capacitor C82 via the nineteenth resistor R89 and to the sixth terminal of the regulating circuit 454 via the nineteenth resistor R89 and a twenty-first resistor R85. The other side of the fifteenth capacitor C82 is coupled to the electrical path between a seventeenth gated diode REF81 and a twenty-sixth resistor R82 via a parallel arrangement of a twenty-sixth capacitor C81. The sixth terminal 458 of the regulating circuit 454 is connected to signal ground via a twentieth resistor R87 and a thirtieth resistor R88, via a twenty-third resistor R80 and a sixteenth capacitor C80 to signal ground and via the twenty-third resistor R80 to a first terminal of the second side of the optocoupler IC2. Inside the second side of the optocoupler IC2, a light emitting diode may be coupled between its first input and its second input. The second terminal of the optocoupler IC2 is coupled to its first terminal via a twenty-fifth resistor R81, to signal ground via a twenty-seventh resistor R83 and a twenty eighth diode REF82 which may be a gated diode, and further to signal ground via the twenty-sixth resistor 82 and a seventeenth diode REF81 which may be a gated diode. The gate of the twenty-eighth gated diode REF82 is coupled to the electrical path between the twentieth resistor R87 and the thirtieth resistor R88; the gate of the seventeenth gated diode REF81 is coupled to the electrical path between the twenty-first resistor R85 and the twenty-second resistor R86. A first terminal of the first side of the optocoupler IC2 is coupled to the first terminal 460 of the regulating circuit 454. A second terminal of the second side of the optocoupler IC2 is coupled to the second terminal 462 of the regulating circuit 454 and via a twenty-eighth resistor R23 to the third terminal 464 and to the fourth terminal 466 of the regulating circuit 454. The third terminal 464 and to the fourth terminal 466 of the regulating circuit 454 are coupled to the reference potential via a twenty-ninth resistor R24. On the first side of the optocoupler IC2, a phototransistor may be arranged between the first terminal and the second terminal of the optocoupler such that its base may be driven by the light generated by the light emitting diode provided on the second side of the optocoupler IC2.

A fourth terminal 466 of the regulating circuit 454 is coupled to a control terminal of a sixth switch Q14. The sixth switch Q14 is coupled between the reference potential and a third terminal 470 of a brown out protection circuit 468. The sixth switch Q14 and the seventh switch Q17 may be configured as BJTs, for example as npn BJTs (bipolar junction transistors). The third terminal 470 of the brown out protection circuit 468 is coupled to an eighth terminal 498 of the discharge and start-up circuit 482 via a twenty-second diode D36 and to the second terminal 430 of the PFC sensing cut off circuit 426. A second terminal 472 of the brown out protection circuit 468 is coupled to a thirteenth terminal ICEN of the controller 438. The electrical path between the thirteenth terminal ICEN of the controller 438 and the second terminal 472 of the brown out protection circuit 468 is coupled to the reference potential via a nineteenth capacitance C11. The second terminal 472 of the brown out protection circuit 468 is coupled to the reference potential via a thirty-fifth resistor R44 and to one terminal of an eighth switch Q41. The other terminal of the switch Q41 is coupled to the ground potential via a twenty-first capacitance C41 and to a first terminal 474 of the brown out protection circuit via a thirty-sixth resistor R42 and a thirty-seventh resistor R41. A control terminal of the eighth switch Q41 is coupled to the third terminal 470 of the brown out protection circuit 468. The first terminal 474 of the brown out protection circuit 468 is coupled to the electrical path between the fourth terminal 422 of the rectifying circuit 416 and the third inductance L2. A seventh terminal 496 of the discharge and start-up circuit 482 is coupled to the reference potential via a twenty-first diode set ZD31 and a fortieth resistor R28. The electrical path between the twenty-first diode ZD31 and the fortieth resistor R28 is coupled to a sixth terminal 494 of the discharge and start-up circuit and to a fourteenth terminal VCORE of the controller 438 via a forty-eighth resistor R29. The fourteenth terminal VCORE of the controller 438 is further coupled to the reference potential via a twentieth capacitance C10. The sixth terminal 494 of the discharge and start-up circuit 482 is coupled to a control terminal of a tenth switch Q32. One terminal of the tenth switch Q33 is coupled to the reference potential and the other terminal of the tenth switch Q33 is coupled to the eighth terminal 498 of the discharge and start-up circuit 482, to the reference potential via a twenty-third capacitance C35 and to a control terminal of a twelfth switch Q31 via a forty-first resistor R35. The electrical path between the forty-first resistor R35 and the twelfth switch Q31 is coupled to one terminal of an eleventh switch Q32 via a forty-second resistor R34. The one terminal of the eleventh switch Q32 is further coupled to its control terminal via a forty-third resistor R37, to the fifth terminal 492 of the discharge and start-up circuit 482 via a twenty-third diode D35, and to one terminal of the twelfth switch Q31 via a forty-fifth resistor R33. The electrical path between the twenty-third diode D35 and the forty-fifth resistor R33 is coupled to the fifth terminal 492 of the discharge and start-up circuit 482 by a forty-fourth resistor R36. The other terminal of the eleventh switch Q32 is coupled to the reference potential. The control terminal of the eleventh switch Q32 is further coupled to a fourth terminal 490 of the discharge and start-up circuit 482. The tenth switch Q33 and the eleventh switch Q32 may be configured as BJTs, for example as npn BJTs. The other terminal of the twelfth switch Q31 is coupled to the ninth terminal 499 of the discharge and start-up circuit 482. The twelfth switch Q31 may be configured as a MOSFET, for example as a self-conducting MOSFET. The fourth terminal 490 of the discharge and start-up circuit 482 is coupled to a second terminal 480 of a discharge control circuit 476. The first terminal 484 of the discharge and start-up circuit 482 is coupled to the reference potential via a series arrangement including a forty-sixth resistor R33, a twenty-fourth capacitance C32 and a twenty-fourth diode D33. The second terminal 486 of the discharge and start-up circuit 482 is coupled to signal to the ground potential via a series arrangement including a forty-seventh resistor R31, a twenty-fifth capacitance C31 and a twenty-fifth diode D34. The electrical path between the twenty-fourth diode D33 and the twenty fourth capacitance C32 is coupled to a third terminal 488 of the discharge and start-up circuit 482 via a twenty-sixth diode D32, the electrical path between the twenty-fifth capacitance C31 and the twenty-fifth diode D34 is coupled to the third terminal 488 of the discharge and start-up circuit 482 via a twenty-seventh diode D31. The third terminal 488 of the discharge and start-up circuit 482 is coupled to a first terminal 478 of a discharge control circuit 476. The first terminal 478 of the discharge control circuit 476 is coupled to the ground potential via a series arrangement including a thirty-ninth resistor R57 and a thirty-eighth resistor R58. A parallel arrangement including a twenty-second capacitance C51 and a twentieth diode ZD51 is coupled between the reference potential and electrical path between the first terminal 478 of the discharge control circuit 476 and the thirty-ninth resistor R57. The electrical path between the thirty ninth resistor R57 and the thirty-eighth resistor R58 is coupled to a control terminal of a ninth switch Q55. One terminal of the ninth switch Q55 is coupled to the reference potential and the other terminal of the ninth switch Q55 is coupled to the second terminal 480 of the discharge control circuit 476. The ninth switch Q55 may be configured as a BJT, for example an npn BJT.

During normal operation of the converter 400 according to various embodiments, an AC (or DC) voltage may be applied to the inputs 402, 404 of the converter 400 and subsequently rectified by the rectifying circuit 416. A (rectified) DC voltage is then applied to the one terminal of the third switch Q3. The third switch Q3 and the fourth switch Q4 are controlled by the controller 438 such that either the input voltage or the reference potential is applied to the seventh inductance L5 of the transformer T1. A transformed voltage is induced in the tenth inductance L8, the eighth inductance L6 and the ninth inductance L7 and a switched DC voltage is provided between the first output 452 and the second output 450 of the converter 400. The DC output voltage is basically derived from the DC voltage applied to the one terminal of the third switch Q3. The third switch Q3 and the fourth switch Q4 may be switched out of phase, i.e. when one is conducting, the other one is not conducting. When the third switch Q3 is set into a conducting state, the voltage applied to the primary side of the transformer T1, i.e. the seventh inductance L5, corresponds to the input voltage applied to the converter 400. When the fourth switch Q4 is set into a conducing state, the seventh inductance L5 is coupled to the reference potential. By adjusting the switching cycle, an average value of a voltage is induced in the secondary side of the transformer T1, i.e. the eighth winding L6 and the ninth winding L7. This average value is the DC voltage that is provided at first and second output 450, 452 of the converter 400 and may be fed to an external load which requires a DC voltage for operation.

In normal operation mode, information about at least one of the output voltage and the output current is provided to the primary side circuit arrangement, for example to the controller 438 in the form of the signal which is provided to the tenth terminal HBFB of the controller 438 via the optocoupler IC2. Accordingly, the controller 438 may adjust the switch control signals provided to the control gates of the third transistor Q3 and the fourth transistor Q4, respectively, in order to adjust the power conversion according to need. The operation monitor which may include the sixteenth resistor R71, the fourteenth diode D73, the seventeenth resistor R72, the fourteenth capacitor C73 and the fifteenth zener diode is provided with energy via the third terminal 446 of the transforming circuit and is able to drive the fifth transistor Q81 such that it is in conducting state. The nineteenth resistor R89 is therefore an active part of the voltage divider via which the output voltage is sampled and compared to a reference voltage by the monitoring circuit 454. In normal operation mode, a base of the seventh transistor Q17 is pulled up and the reference potential is applied to the base of the sixth transistor Q14 which remains non-conducting, such that the sixth transistor Q14 which may provide (together with the twenty-ninth resistor R24) the functionality of the operation mode detector may be inactive. In normal operation mode the optocoupler IC2 is provided with a current from the ninth terminal VDD of the controller 438 via the sixteenth diode D13.

The burst mode may be initiated by the event of the external load being disconnected from the outputs 450, 452 or by the detection of a low load state. Entering the burst mode may begin with the controller 438 sensing at its tenth terminal HBFB an increasing output current of the optocoupler IC2 or a steadily high output current of the optocoupler IC2. Upon detecting any one of those conditions, the controller 438 deactivates itself. In addition, the seventh transistor Q17 is rendered non-conducting by a corresponding driving signal provided thereto from the eleventh output IO of the controller 438 such that the reference potential is disconnected from the base of the sixth transistor Q14 which may now be controlled by the output current of the optocoupler IC2. As the transistor Q14 is rendered conducting, the potential at the third terminal 470 of the brown out protection circuit, at the eighth terminal 498 of the discharge and start-up circuit and the second terminal 430 of the PFC sensing cut off circuit 426 is pulled down such that those circuits are deactivated and do not consume any power. Due to the controller 438 being inactive, there is also no power being provided to and converted in the transformer T1 such that that the operation monitor circuit is not provided with energy and is not able to keep the fifth transistor Q81 conducting which is consequently rendered non-conducting. Thereby, the nineteenth resistor R89 is disconnected from the voltage divider and a bigger fraction of the output voltage is sampled at the fourth terminal 448 of the transforming circuit 440 and provided to the regulating circuit within the monitoring circuit 454. As the controller 438 is deactivated at this phase, the optocoupler IC2 is provided with energy from the second energy source including the tenth capacitance C18 and fifteenth resistor R16. The tenth capacitor C18 has been charged during normal operation of the converter 400 via the tenth inductance L8 which is part of the primary side of the transformer T1.

During the off-state in burst mode, as long as the output voltage has not decreased to a value below the second threshold value, the regulating circuit 454 is configured to drive the optocoupler IC2 with sufficient power such that the output current applied to the base of the sixth transistor Q14 on the primary side of the converter circuit is sufficient for keeping the sixth transistor Q14 conducting. In that state, the brown out protection circuit 468, the discharge and start-up circuit 482 and the PFC sensing cut off circuit remain inactive, i.e. remain in a state not permitting any current flowing therethrough, such that the power consumed in the off-state of the burst mode may be reduced.

When the output voltage drops below the second threshold value, for example 18.5 V as was the case of the exemplary scenario presented in diagram 304 of FIG. 3C, the transmitting side of the optocoupler IC2 is driven with less power or is provided with a zero signal by the regulating circuit 454 such that the output current through the receiving side of the optocoupler IC2 drops below the predefined value and substantially may drop to zero. The sixth transistor Q14 may be configured to be rendered into a non-conducting state when its base current drops below the predefined value which may be slightly larger than zero. When the sixth transistor becomes non-conducting, the potential at the gate of the eighth transistor Q41 in the brown out protection circuit and the potential at the gate of the second transistor Q2 in the PFC sensing cut off circuit are pulled up. In such a case, the brown out protection circuit also fulfils the functionality of a "wake up" circuit as it then provides a high potential to the thirteenth terminal ICEN which reactivates or enables the controller 438. The energy during the reactivation phase of the controller 438 may be provided by the second energy supply to the first terminal VCC of the controller 438. A non-zero potential applied to the gate of the second transistor Q2 activates the PFC sensing cut off circuit and the voltage across the fourth capacitance C7 may be measured by the controller 438. The controller 438 takes over control of the third transistor Q3 and the fourth transistor Q4 and the power conversion process is resumed in the transformer T1. The fifth transistor Q81 is rendered conducting such that the monitoring circuit 454 senses a smaller fraction of the output voltage, i.e. its internal reference behaves as if it were at a higher value, for example the first threshold value which may be larger than the second threshold value which was used during the off-phase in burst mode. The seventh transistor Q17 is rendered conducting by the controller 438 which provides a current to its base such that the sixth transistor Q14 is rendered non-conducting. The receiving side of the optocoupler IC2 is provided with energy from the first power supply again such that full signal bandwidth may be used for transmitting information about at least one of the output voltage and the output current to the primary side circuit arrangement, e.g. to the controller 438.

If during the on-phase of the converter 400 the controller 438 detects that an external load is connected to the output 452, 452 of the converter 400, the converter 400 remains in its current state which by definition then corresponds to the normal operation mode. If, on the other hand, no load is connected to the output 452, 452 of the converter 400 in the on-phase during burst mode, the controller 400 remains in standby mode and enters the off-state in burst mode as previously described, for example with respect to the diagrams shown in FIGS. 3A to 3D.

Figure 5:
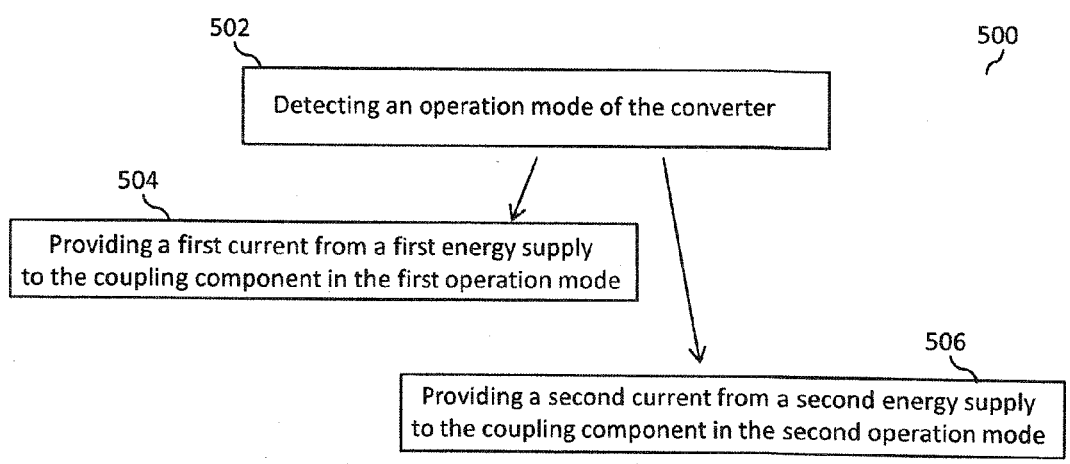
FIG. 5 shows a method for operating the converter according to various embodiments.

In FIG. 5 a method 500 for operating the converter 200 according to various embodiments is shown. In step 502, the operation mode of the converter 200 according to various embodiments is detected. The detection process may be based on the signal level of the output signal, e.g. the output current, of the first side (i.e. the receiving side) of the coupling component 228. The detection process, depending on the operation mode of the converter 200 according to various embodiments, may be performed by the controller 210 or by the operation mode detector 244. In step 502, if the converter 200 according to various embodiments is in a first operation mode, e.g. in the normal operation mode or in the on-phase of burst mode, a first current from a first energy supply may be provided to the coupling component 228. In step 504, if on the other hand the converter 200 according to various embodiments is in a second operation mode, e.g. in the off-phase of burst mode, a second current from a second energy supply may be provided to the coupling component 228. The second current may be smaller than the first current. In various embodiments of the method for operating the converter 200, providing the first current in the first operation mode of the converter 200 may include providing a main current from a main energy supply and an auxiliary current from an auxiliary energy supply simultaneously. In various embodiments of the method for operating the converter 200, providing the second current in the second operation mode of the converter 200 may include providing only the auxiliary current from the auxiliary energy supply.

In various embodiments, a converter is provided which may include: a transformer including a primary side and a secondary side; a primary side circuit arrangement coupled to the primary side of the transformer; a secondary side circuit arrangement coupled to the secondary side of the transformer, wherein the secondary side circuit arrangement is configured to provide at least one of an output voltage and an output current; a coupling component configured to provide information about at least one of the output voltage and the output current to the primary side circuit arrangement; a first energy supply configured to provide the coupling component with a first current; and a second energy supply configured to provide the coupling component with a second current, wherein the second current is lower than the first current.

According to various embodiments, the converter may be configured as an isolated switched mode power supply.

According to various embodiments of the converter, the primary side circuit arrangement may include at least one switch which is configured to determine a current flow through the primary side of the transformer depending on a switch control signal.

According to various embodiments of the converter, the primary side circuit arrangement may include a controller configured to provide the at least one switch control signal to the at least one switch.

According to various embodiments of the converter, the controller may include a modulation circuit configured to generate the at least one switch control signal.

According to various embodiments of the converter, the modulation circuit may be configured as a pulse width modulation circuit or as a pulse frequency modulation circuit.

According to various embodiments of the converter, the coupling component may include a first side and a second side which are galvanically decoupled from one another.

According to various embodiments of the converter, the coupling component may include an optocoupler.

According to various embodiments of the converter the first side of the coupling element may be coupled to the primary side circuit arrangement.

According to various embodiments of the converter, the second side of the coupling element may be coupled to the secondary side circuit arrangement.

According to various embodiments of the converter, the coupling component may be configured to operate in a first mode and a second mode.

According to various embodiments of the converter, the first mode the first energy source and the second energy source may be configured to provide energy to the first side of the coupling element.

According to various embodiments of the converter, wherein in the second mode only the second energy source may be configured to provide energy to the first side of the coupling element.

According to various embodiments of the converter, the second energy source may be configured to be charged during the first mode by the primary side circuit arrangement.

According to various embodiments of the converter, the information about at least one of the output voltage and the output current may correspond to an amplitude of a signal generated by the first side of the coupling component.

According to various embodiments of the converter, the information about at least one of the output voltage and the output current may correspond to a frequency of pulses generated by the first side of the coupling component.

According to various embodiments of the converter, the information about at least one of the output voltage and the output current may correspond to a width of pulses generated by the first side of the coupling component.

According to various embodiments of the converter, the amplitude of the signal may correspond to a current value.

According to various embodiments of the converter, the amplitude of the signal may correspond to a voltage value.

According to various embodiments of the converter, the coupling component may be configured to operate in the first mode when the controller is activated.

According to various embodiments of the converter, the primary side circuit arrangement may include a controller configured to provide the at least one switch control signal to the at least one switch and during the operation of the coupling component in the first mode the controller may be configured to adjust a current flow through the primary side of the transformer in accordance with the signal generated by the first side of the coupling component.

According to various embodiments of the converter, the primary side circuit arrangement may be configured to deactivate the controller when the signal amplitude exceeds a first threshold value.

According to various embodiments of the converter, the primary side circuit arrangement may be configured to deactivate the controller when the signal amplitude has remained above a predefined value for a predefined period of time.

According to various embodiments of the converter, the primary side circuit arrangement may be configured to deactivate the first energy source when the controller is deactivated.

According to various embodiments of the converter, the controller may include the first energy source.

According to various embodiments of the converter, the coupling component may be configured to operate in the second mode after the signal amplitude has exceeded the first threshold value.

According to various embodiments of the converter, the coupling component may be configured to operate in the second mode after the signal amplitude has remained above the predefined value for the predefined period of time.

According to various embodiments of the converter, the primary side circuit arrangement may include the controller configured to provide the at least one switch control signal to the at least one switch, the converter further including an operation mode detection circuit coupled to the primary side circuit arrangement and configured to activate the controller when the signal amplitude drops below a second threshold value during the operation of the coupling component in the second mode.

According to various embodiments of the converter, the operation mode detection circuit may be configured to activate the first energy source when the signal amplitude drops below the second threshold value during the operation of the coupling component in the second mode.

According to various embodiments of the converter, wherein the coupling component may be configured to be operated in the first mode after the signal amplitude drops below the second threshold value during the operation of the coupling component in the second mode.

In various further embodiments a converter is provided, including: a transformer including a first side and a second side; a first circuit coupled to the first side of the transformer; a second circuit coupled to the second side of the transformer, wherein the second circuit may be configured to provide an output voltage; a transmitter configured to provide information about the output voltage to the first circuit; a first energy supply configured to provide the transmitter with a first current; and a second energy supply configured to provide the coupling component with a second current, wherein the second current is different from the first current.

According to various embodiments of the converter, the converter may be configured as an isolated switched mode power supply.

According to various embodiments of the converter, the first circuit may include at least one switch which is configured to determine a current flow through the first side of the transformer depending on a switch control signal.

According to various embodiments of the converter, the first circuit side may include a controller configured to provide the at least one switch control signal to the at least one switch.

According to various embodiments of the converter, the controller may include a modulation circuit configured to generate the at least one switch control signal.

According to various embodiments of the converter, the modulation circuit may be configured as a pulse width modulation circuit or as a pulse frequency modulation circuit.

According to various embodiments of the converter, the transmitter may include a receiving side and a sending side which are galvanically decoupled from one another.

According to various embodiments of the converter, the transmitter may include an optocoupler.

According to various embodiments of the converter, the receiving side of the transmitter may be coupled to the first circuit.

According to various embodiments of the converter, the sending side of the transmitter may be coupled to the second circuit.

According to various embodiments of the converter, the transmitter may be configured to operate in a first mode and a second mode.

According to various embodiments of the converter, in the first mode the first energy source and the second energy source may be configured to provide energy to the receiving side of the transmitter.

According to various embodiments of the converter, in the second mode only the second energy source may be configured to provide energy to the receiving side of the transmitter.

According to various embodiments of the converter, the second energy source may be configured to be charged during the first mode by the first circuit.

According to various embodiments of the converter, the information about the output voltage may correspond to an amplitude of a signal generated by the receiving side of the transmitter.

According to various embodiments of the converter, the amplitude of the signal may correspond to a current.

According to various embodiments of the converter, the amplitude of the signal may correspond to a voltage.

According to various embodiments of the converter, the information about the output voltage may correspond to a frequency of pulses generated by the receiving side of the transmitter.

According to various embodiments of the converter, the information about at least one of the output voltage may correspond to a width of pulses generated by the receiving side of the transmitter.

According to various embodiments of the converter, the transmitter may be configured to operate in the first mode when the controller is operating.

According to various embodiments of the converter, the first circuit may include the controller configured to provide the at least one switch control signal to the at least one switch; and during the operation of the transmitter in the first mode the controller may be configured to adjust a current flow through the first side of the transformer in accordance with the signal generated by the receiving side of the transmitter.

According to various embodiments of the converter, wherein the first circuit may be configured to deactivate the controller when the signal amplitude exceeds an upper threshold.

According to various embodiments of the converter, the first circuit may be configured to deactivate the controller when the signal amplitude has remained above a predefined value for a predefined period of time.

According to various embodiments of the converter, the first circuit may be configured to deactivate the first energy source when the controller is deactivated.

According to various embodiments of the converter, the first energy source may be provided in the controller.

According to various embodiments of the converter, the transmitter may be configured to operate in the second mode after the signal amplitude has exceeded the upper threshold.

According to various embodiments of the converter, the transmitter may be configured to operate in the second mode after the signal amplitude has remained above the predefined value for the predefined period of time.

According to various embodiments of the converter, the first circuit may include the controller configured to provide the at least one switch control signal to the at least one switch, the converter further including an operation mode detector coupled to the first circuit and configured to activate the controller when the signal amplitude drops below a lower threshold during the operation of the transmitter in the second mode.

According to various embodiments of the converter, the operation mode detector may be configured to activate the first energy source when the signal amplitude drops below the lower threshold during the operation of the coupling component in the second mode.

According to various embodiments of the converter, the transmitter may be configured to be operated in the first mode after the signal amplitude drops below the lower threshold during the operation of the transmitter in the second mode.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A converter comprising:
    a transformer comprising a primary side and a secondary side;
    a primary side circuit arrangement coupled to the primary side of the transformer;
    a secondary side circuit arrangement coupled to the secondary side of the transformer, wherein the secondary side circuit arrangement is configured to provide at least one of an output voltage and an output current;
    a coupling component configured to provide information about at least one of the output voltage and the output current to the primary side circuit arrangement and configured to operate in a first mode and a second mode, the coupling component comprising a first side and a second side which are galvanically decoupled from one another;
    the primary side circuit arrangement comprising a first energy supply source configured to provide the coupling component with a first current; and
    the primary side circuit arrangement further comprising a second energy supply source configured to provide the coupling component with a second current,
    wherein the second current is lower than the first current,
    wherein in the first mode the first energy source and the second energy source are configured to provide energy to the first side of the coupling component, and
    wherein in the second mode only the second energy source is configured to provide energy to the first side of the coupling component.

2. The converter of claim 1,
    wherein the primary side circuit arrangement comprises a controller configured to provide the at least one switch control signal to the at least one switch.

3. The converter of claim 1,
    wherein the first side of the coupling component is coupled to the primary side circuit arrangement.

4. The converter of claim 1,
    wherein the second side of the coupling component is coupled to the secondary side circuit arrangement.

5. The converter of claim 1,
    wherein the information about at least one of the output voltage and the output current corresponds to an amplitude of a signal generated by the first side of the coupling component.

6. The converter of claim 1,
    wherein the information about at least one of the output voltage and the output current corresponds to a frequency of pulses generated by the first side of the coupling component.

7. The converter of claim 1,
    wherein the primary side circuit arrangement comprises a controller configured to provide the at least one switch control signal to the at least one switch; and
    wherein during the operation of the coupling component in the first mode the controller is configured to adjust a current flow through the primary side of the transformer in accordance with the signal generated by the first side of the coupling component.

8. The converter of claim 1, wherein the coupling component comprises an optocoupler.

9. The converter of claim 2,
    wherein the coupling component is configured to operate in the first mode when the controller is activated.

10. The converter of claim 2,
wherein the primary side circuit arrangement is configured to deactivate the first energy supply source when the controller is deactivated.
11. The converter of claim 2,
wherein the controller comprises the first energy supply source.
12. The converter of claim 5,
wherein the primary side circuit arrangement comprises a controller configured to provide the at least one switch control signal to the at least one switch; and
wherein the primary side circuit arrangement is configured to deactivate the controller when the signal amplitude exceeds a first threshold value.
13. The converter of claim 5,
wherein the primary side circuit arrangement comprises a controller configured to provide the at least one switch control signal to the at least one switch; and
wherein the primary side circuit arrangement is configured to deactivate the controller when the signal amplitude has remained above a predefined value for a predefined period of time.
14. The converter of claim 5,
wherein the coupling component is configured to be operated in the first mode after the signal amplitude drops below a second threshold value during the operation of the coupling component in the second mode.
15. The converter of claim 12,
wherein the coupling component is configured to operate in the second mode after the signal amplitude has exceeded the first threshold value.
16. The converter of claim 13,
wherein the coupling component is configured to operate in the second mode after the signal amplitude has remained above the predefined value for the predefined period of time.
17. A converter comprising:
a transformer comprising a first side and a second side;
a first circuit coupled to the first side of the transformer;
a second circuit coupled to the second side of the transformer, wherein the second circuit is configured to provide an output voltage;
a transmitter configured to provide information about the output voltage to the first circuit and configured to operate in a first mode and a second mode, the transmitter comprising a receiving side and a sending side which are galvanically decoupled from one another;
the first circuit comprising a first energy supply source configured to provide the transmitter with a first current; and
the first circuit further comprising a second energy supply source configured to provide the transmitter with a second current, wherein the second current is different from the first current,
wherein in the first mode the first energy supply source and the second energy supply source are configured to provide energy to the receiving side of the transmitter, and wherein in the second mode only the second energy source is configured to provide energy to the receiving side of the transmitter.
18. The converter of claim 17,
wherein the first circuit comprises a controller configured to provide the at least one switch control signal to the at least one switch; and
wherein during the operation of the transmitter in the first mode the controller is configured to adjust a current flow through the first side of the transformer in accordance with the amplitude of a signal generated by the receiving side of the transmitter.
19. The converter of claim 17, wherein the transmitter comprises an optocoupler.
20. A converter comprising:
a transformer comprising a primary side and a secondary side;
a primary side circuit arrangement coupled to the primary side of the transformer;
a secondary side circuit arrangement coupled to the secondary side of the transformer, wherein the secondary side circuit arrangement is configured to provide at least one of an output voltage and an output current;
a coupling component configured to provide information about at least one of the output voltage and the output current to the primary side circuit arrangement and configured to operate in a first mode and a second mode, the coupling component comprising a first side and a second side which are galvanically decoupled from one another;
a first energy supply source configured to provide the coupling component with a first current; and
a second energy supply source configured to provide the coupling component with a second current, wherein the second current is lower than the first current, wherein in the first mode the first energy source and the second energy source are configured to provide energy to the first side of the coupling component, and wherein in the second mode only the second energy source is configured to provide energy to the first side of the coupling component.

* * * * *